US012485690B2

(12) United States Patent
Liberato et al.

(10) Patent No.: US 12,485,690 B2
(45) Date of Patent: Dec. 2, 2025

(54) RIBBON FOR USE IN PRODUCING PRINTER ACTIVATABLE INDICATORS

(71) Applicant: Temptime Corporation, Morris Plains, NJ (US)

(72) Inventors: Eric W. Liberato, Pequannock, NJ (US); John Olson, Dayton, NJ (US); James J. O'Hagan, McHenry, IL (US); Mohannad Abdo, Clifton, NJ (US); Gene A. Hofer, Lake Zurich, IL (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 59 days.

(21) Appl. No.: 18/369,548

(22) Filed: Sep. 18, 2023

(65) Prior Publication Data

US 2025/0091373 A1 Mar. 20, 2025

(51) Int. Cl.
*B41J 31/06* (2006.01)
*B41J 2/335* (2006.01)
(Continued)

(52) U.S. Cl.
CPC ............. *B41J 31/06* (2013.01); *B41J 2/3355* (2013.01); *B41J 3/4075* (2013.01); *B41J 33/006* (2013.01); *B41J 33/26* (2013.01)

(58) Field of Classification Search
CPC ........ B41J 31/06; B41J 2/3355; B41J 3/4075; B41J 33/006; B41J 33/26; B41J 2/315;
(Continued)

(56) References Cited

U.S. PATENT DOCUMENTS 6,544,926 B1 4/2003 Bodmer et al.
6,573,922 B1 * 6/2003 Orita ........................ B41J 2/315 347/191

(Continued)

FOREIGN PATENT DOCUMENTS

JP 11342673 * 12/1999 ............. B41M 5/26

OTHER PUBLICATIONS

Search Report and Written Opinion dated Jan. 13, 2025 issued for International PCT Patent Application No. PCT/US24/47118.

*Primary Examiner* — Kristal Feggins
(74) *Attorney, Agent, or Firm* — K&L Gates LLP

(57) ABSTRACT

Disclosed is a thermal transfer ribbon for use with a media processing device. The thermal transfer ribbon includes a carrier layer and a transfer layer operatively coupled to the carrier layer. The transfer layer includes an environmental indicator material encapsulated in a plurality of microcapsules. The plurality of microcapsules prevent the environmental indicator material from producing an observable effect in response to exposure to a predetermined environmental condition. The environmental indicator material is released from the plurality of microcapsules in response to the plurality of microcapsules being ruptured. After the environmental indicator material is released and exposed to the predetermined environmental condition, the environmental indicator material produces the observable effect. The observable effect results from a change in the environmental indicator material from an original state to a second state in response to the predetermined environmental condition.

20 Claims, 19 Drawing Sheets

(51) Int. Cl.
*B41J 3/407* (2006.01)
*B41J 33/00* (2006.01)
*B41J 33/26* (2006.01)

(58) Field of Classification Search
CPC ... B41J 2/32; B41J 2/325; B41F 16/00; B41F 16/0006
See application file for complete search history.

(56) References Cited

U.S. PATENT DOCUMENTS

| | | | | |
|---|---|---|---|---|
| 6,876,374 | B2 * | 4/2005 | Miyazaki | B41J 2/355<br>347/175 |
| 11,718,103 | B2 * | 8/2023 | Fisher | B41M 5/36<br>347/171 |
| 2015/0153315 | A1 | 6/2015 | Taylor et al. | |
| 2022/0412933 | A1 | 12/2022 | Millman et al. | |

* cited by examiner

RIBBON FOR USE IN PRODUCING PRINTER ACTIVATABLE INDICATORS

BACKGROUND

The present disclosure generally relates to printing with a thermal transfer ribbon using a media processing devices, such as printers or encoders. The media processing device prints with the thermal transfer ribbon on a printable substrate, the printable substrate can be placed on objects, such as packages, products for sale at retail, stock shelf labels, etc. The printable substrate may be provided on various types of media, such as a roll or stack of labels, tags, wristbands, inlays, or plastic cards, and the printable substrate may come in different sizes (e.g., different shapes, lengths, widths and/or thicknesses).

BRIEF DESCRIPTION OF THE SEVERAL VIEWS OF THE DRAWINGS

The novel features of the various aspects are set forth with particularity in the appended claims. Throughout the figures like reference characters designate like or corresponding parts throughout the several views of the drawings. The described aspects, however, both as to organization and methods of operation, may be best understood by reference to the following description, taken in conjunction with the accompanying drawings in which:

Figure 1:
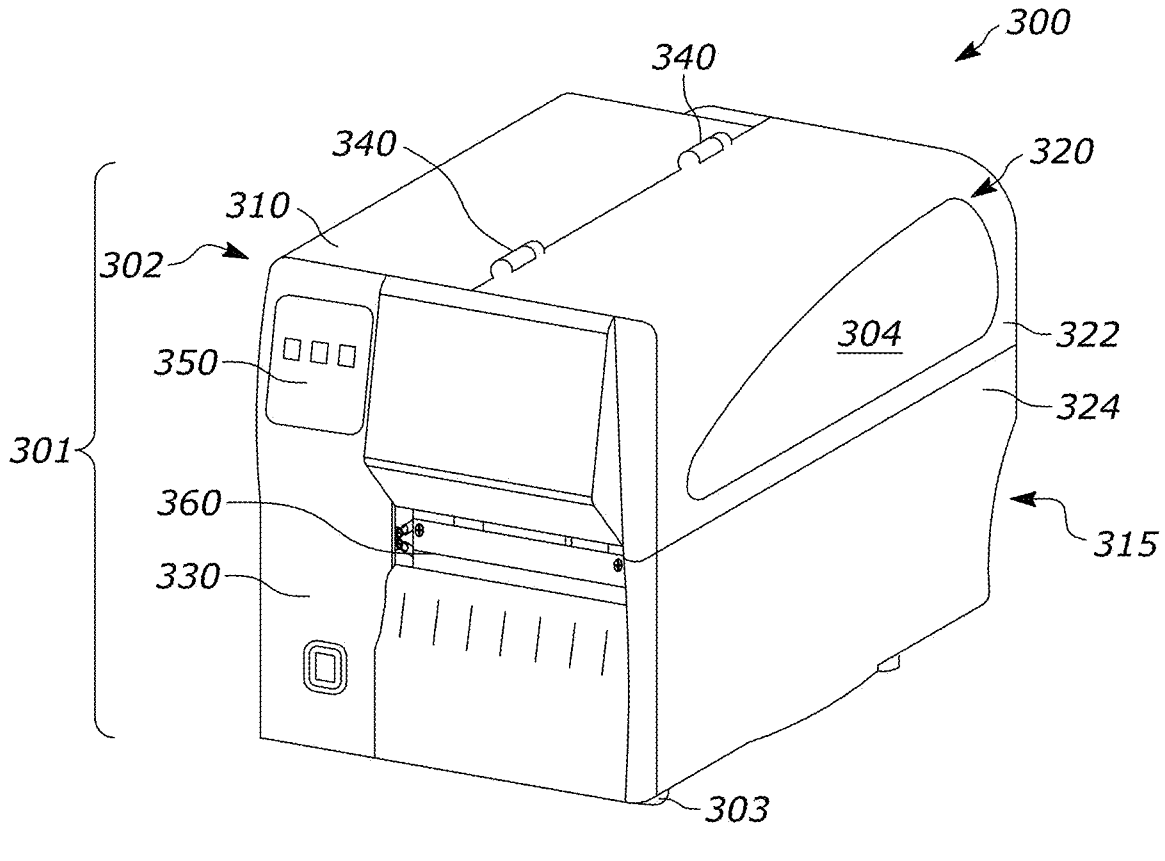
FIG. 1 illustrates a media processing device, according to at least one aspect of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Environmental sensors using chemical based indicators (e.g., formed with environmental indicator materials) can provide an observable response. Such indicators may produce an observable response in response to a predetermined environmental condition, for example a change in color state, e.g., hue, transparency, darkness, etc., a change in a state of matter (e.g., viscosity or fluidity), or a change in an electrical property, in response to exposure a predetermined environmental condition or response condition, such as exposure to a high temperature above a predetermined temperature threshold or response temperature.

Such sensors may be partly limited, or produced with higher costs, due to manufacturing and/or handling (e.g., shipping and storage) requirements. For example, in a practical application an environmental sensor that uses a chemical based indicator for high temperature excursions, e.g., an ambient temperature that is too warm, the environmental indicator materials utilized in the chemical based indicator are often required to be manufactured and handled in environments below the response temperature prior to their use with a host product. Similarly an environmental sensor that uses a chemical based indicator configured as a humidity detector needs to be kept dry, and an environmental sensor that uses a chemical based indicator configured as a UV or light exposure indicator needs to be kept out of the sun, prior to deployment with a host product. One solution to simplifying the use of such environmental indicator materials and/or environmental sensors that use chemical based indicators, and particularly the management of the supply chain of such environmental indicator materials and/or environmental sensors prior to pairing, deploying, or otherwise associating the environmental sensors with products, is to introduce mechanisms to activate these environmental indicator materials at the end point of application. Some prior activatable indicators rely on keeping materials separate mechanically and then joining them together, e.g., by removing a barrier sheet or bringing two halves of a clamshell structure into close contact. Prior to activation, the indicator does not react with relevant environmental stimulus. Another approach is to encapsulate the environmental indicator materials, and activate them by rupturing the encapsulation to release the environmental indicator materials as described herein and in concurrently filed related applications: U.S. patent application Ser. No. 18/369,498, filed on Sep. 18, 2023, titled "PRINTER ACTIVATABLE ENVIRONMENTAL SENSING THROUGH CHEMICAL ENCAPSULATION", U.S. patent application Ser. No. 18/369,520, filed on Sep. 18, 2023, titled "MEDIA PROCESSING DEVICE AND COMPONENTS FOR ACTIVATABLE MEDIA PLATFORMS"; and U.S. patent application Ser. No. 18/369,506, filed on Sep. 18, 2023, U.S. patent application Ser. No. 18/369,536, filed on Sep. 18, 2023, titled "USE OF ENCAPSULATED POLAR PROTIC CHEMISTRIES FOR RFID TEMPERATURE MONITORING".

The encapsulated environmental indicator materials can be placed on media to form an environmental sensor on the media. The environmental sensor can then be later activated with physical forces such as pressure, sheer, cutting or friction sufficient to rupture the encapsulation. The forces can be applied with a device, e.g. a media processing device, or by a user pinching environmental sensor by hand.

In at least one aspect, the encapsulated environmental indicator materials are printed from a ribbon onto a media through a thermal transfer printing process. The environmental sensor is activated based on physical forces such as pressure, sheer, cutting or friction being applied to the environmental sensor. In at least one aspect, the environmental sensor is activated during the thermal transfer printing process with the forces being applied by the media processing device. In an alternative aspect, the environmental sensor is activated later after printing by a device (e.g. a media processing device), by hand with a user pinching the environmental sensor, or by some other activation mechanism. In some aspects, heat is also be applied to the environmental sensor for activation. In at least one aspect, the ribbon can include a bursting additive to increase the ease of rupturing the indicator materials' encapsulation and activate the environmental sensor.

The solution of having a ribbon with encapsulated environmental indicator material that can be transferred to media to form an activatable environmental sensor on the media may provide various benefits. The ribbon with the encapsulated environmental indicator material can be stored without worrying about ruining the environmental indicator material. For example, if the environmental indicator material was designed to respond to a temperature above a response temperature, the ribbon with the encapsulated environmental indicator material can be stored in the non-activated configuration at a temperature above the response temperature without ruining or degrading the ribbon. This avoids the need to maintain a strict cold chain for the ribbon before it is used to transfer the environmental indicator material to media to form an activable environmental sensor to be paired, deployed, or otherwise associated with products. At the time the encapsulated indicator material is transferred from the ribbon to the media or at a later time (e.g., when the media containing the environmental sensor is being associated with a particular product) the environmental sensor on the label can be placed in an activated configuration, where the environmental sensor would from that point in would provide a detectable response to the temperature increasing above the response temperature. Additionally, the ability to store the encapsulated environmental indicator material on the ribbon facilitates the end-user in generating and selectively activating environmental sensors when desired. This process should allow the end-user to easily create, store, and use media with environmental sensors to monitor an environment for a response condition, e.g. the temperature being below a threshold, a humidity below a threshold, etc.

In one general aspect, the present disclosure provides a thermal transfer ribbon for use with a media processing device. The thermal transfer ribbon includes a carrier layer and a transfer layer operatively coupled to the carrier layer. The transfer layer includes an environmental indicator material encapsulated in a plurality of microcapsules. The plurality of microcapsules preventing the environmental indicator material from producing an observable effect in response to exposure to a predetermined environmental condition. The environmental indicator material is released from the plurality of microcapsules in response to the plurality of microcapsules being ruptured. After the environmental indicator material is released and exposed to the predetermined environmental condition, the environmental indicator material produces the observable effect. The observable effect resulting from a change in the environmental indicator material from an original state to a second state in response to the predetermined environmental condition.

In at least one aspect, the transfer layer further includes a microcapsule panel comprising the plurality of microcapsules and an ink panel positioned adjacent the microcapsule panel. In at least one aspect, the ink panel spans a length of the thermal transfer ribbon and the microcapsule panel spans the same length of the thermal transfer ribbon. In at least one aspect, the microcapsule panel spans a first length of the thermal transfer ribbon, wherein the ink panel spans a second length of the thermal transfer ribbon, and wherein the second length begins sequentially after the first length.

In at least one aspect, the transfer layer comprises a first plurality of portions and a second plurality of portions, wherein the first plurality of portions comprises the plurality of microcapsules.

In at least one aspect, the transfer layer includes a first portion and a second portion, the first portion and second portion spanning a length of the transfer layer, wherein the first portion comprises the plurality of microcapsules.

In at least one aspect, the thermal transfer ribbon further includes a back coating attached to the carrier layer, wherein the back coating is opposite the transfer layer.

In at least one aspect, the thermal transfer ribbon, further includes a release layer positioned between the carrier layer and transfer layer.

In at least one aspect, the media processing device is a thermal transfer printer, and the plurality of microcapsules are configured to be printed on a media element by the media processing device when the media processing device is used to print the media element using a thermal transfer process. In this aspect, the plurality of microcapsules remain intact during the thermal transfer process.

In at least one alternative aspect, at least a portion of the plurality of microcapsules are configured to be ruptured in response to a force greater than or equal to a predetermined threshold. In at least one aspect, the force is a pressure force, at least a portion of the plurality of microcapsules are ruptured based on the pressure force, and the predetermined threshold is between 1.5 and 8 pounds per square inch.

In at least one aspect, the media processing device is a thermal transfer printer, and the plurality of microcapsules are configured to rupture in response to the force applied by the media processing device to a media element when the media processing device is used to transfer at least a portion of the transfer layer to the media element using a thermal transfer process.

In at least one aspect, the thermal transfer ribbon further includes a bursting additive proximate the plurality of microcapsules. In at least one aspect, the transfer layer further comprises the bursting additive. In at least one alternative aspect, the bursting additive increases an effective force applied to each microcapsule of the plurality of microcapsules when the force is applied to the plurality of microcapsules.

In at least one aspect, the carrier layer further includes the bursting additive, and wherein the bursting additive is aligned with regions of the transfer layer containing the plurality of microcapsules. In at least one aspect, the bursting additive is positioned in an intermediate layer attached to the carrier layer, and the bursting additive is aligned with regions of the transfer layer containing the plurality of microcapsules.

In at least one aspect, the bursting additive includes a plurality of microneedles. In at least one aspect, the bursting additive includes an abrasive material. In at least one aspect, the abrasive material comprises particles, and the particles are harder than the plurality of microcapsules. In at least one aspect, the particles have a diameter between 25 nanometers-500 micrometers. In at least one aspect, the bursting additive increases a hardness at an area of the bursting additive on the thermal transfer ribbon, and the area has a hardness greater than or equal to a 2 on the Mohs hardness scale.

In at least one aspect, at least a portion of the plurality of microcapsules are ruptured based on a pressure force being applied to the thermal transfer ribbon, and wherein the bursting additive reduces an amount of pressure force required to be applied to the plurality of microcapsules in order to burst the plurality of microcapsules by anywhere between 5 and 90 percent.

In at least one aspect, the bursting additive increases an effective pressure force applied to the microcapsules by up to 15 pounds per square inch.

In at least one aspect, at least a portion of the plurality of microcapsules are ruptured in response to a temperature of the at least the portion of the plurality of microcapsules being equal to or greater than a predetermined temperature threshold. In at least one aspect, the media processing device is a thermal transfer printer, wherein the plurality of microcapsules are configured to rupture in response to a heat applied by the media processing device to a media element when the device is used to transfer at least a portion of the transfer layer to the media element using a thermal transfer process, and wherein the heat causes the temperature of the at least the portion of the plurality of microcapsules to be equal to or greater than the predetermined temperature threshold. In at least one aspect, the predetermined temperature threshold is between 90° C. and 250° C.

In at least one aspect, at least a portion of the plurality of microcapsules are ruptured based on a combination of (a) a force greater than or equal to a predetermined threshold applied to the plurality of microcapsules and (b) a temperature of the at least the portion of the plurality of microcapsules being equal to or greater than a predetermined temperature threshold.

In at least one aspect, the predetermined temperature threshold is between 90° C. and 110° C. In at least one aspect, at least the portion of the plurality of microcapsules are ruptured based on a pressure force, and the predetermined threshold is between 4 and 15 pounds per square inch.

In at least one aspect, each microcapsule of the plurality of microcapsules has at least a first wall and a second wall encapsulating the environmental indicator material. The first wall is configured to rupture based, in part, on a temperature being equal to or greater than a predetermined temperature threshold, and the second wall is configured to rupture based on a pressure force, a shear force, a frictional force, or a cutting force being equal to or greater than a predetermined threshold.

In at least one aspect, the observable effect includes at least one effect selected from the group consisting of a color state change, a change in transparency, a change in hue, a change in an electrical property, a change in conductivity, a change in capacitance, a movement of the environmental indicator material along a substrate, and combinations thereof.

In at least one aspect, the predetermined environmental condition comprises at least one condition selected from the group consisting of temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, exposure to a particular chemical, oxygen exposure, ammonia exposure, exposure to a particular chemical above a threshold concentration, exposure to a particular chemical above the threshold concentration for at least a predetermined amount of time, exposure to at least a predetermined amount of radiation of a particular type, ultraviolet light exposure, humidity exposure, exposure to a humidity level above a predetermined threshold, and exposure to a humidity level above a predetermined threshold for at least a predetermined amount of time.

In at least one aspect, the environmental indicator material comprises a polymer having side-chain crystallinity. In at least one aspect, the environmental indicator material comprises an alkane wax.

In at least one aspect, the plurality of microcapsules comprise a gel. In at least one aspect, the plurality of microcapsules comprise a protein. In at least one aspect, the plurality of microcapsules comprise polyurea formaldehyde. In at least one aspect, the plurality of microcapsules comprise polymelamine formaldehyde. In at least one aspect, the plurality of microcapsules comprise a wax material. In at least one aspect, the plurality of microcapsules comprise emulsions. In at least one aspect, the plurality of microcapsules have a diameter length between 20 to 250 μm.

In another general aspect, the present disclosure provides an apparatus. The apparatus includes a thermal transfer ribbon as described in any of the previously described aspects. The apparatus further includes a media processing device. The media processing device includes a print head and a roller positioned adjacent the print head, where the thermal transfer ribbon is positioned between the print head and the roller.

In yet another general aspect, the present disclosure provides a method of applying an environmental sensor to a media element with a media processing device. The method includes feeding a media element into an upstream end of a print head assembly of the media processing device. The print head assembly includes a thermal transfer ribbon including a carrier layer; and a transfer layer operatively coupled to the carrier layer. The transfer layer includes an environmental indicator material encapsulated in a plurality of microcapsules. The plurality of microcapsules preventing the environmental indicator material from producing an observable effect in response to exposure to a predetermined environmental condition. The environmental indicator material is released from the plurality of microcapsules in response to the plurality of microcapsules being ruptured. After the environmental indicator material is released and exposed to the predetermined environmental condition, the environmental indicator material produces the observable effect. The observable effect resulting from a change in the environmental indicator material from an original state to a second state in response to the predetermined environmental condition. The method further includes printing a portion of the transfer layer onto the media element by thermal transfer printing with the print head assembly. The portion of the transfer layer includes a portion of the plurality of microcapsules, wherein the portion of the plurality of microcapsules form a second plurality of microcapsules on the media element. The second plurality of microcapsules form the environmental sensor on the media element. The method further includes feeding the media element out of a downstream end of the print head assembly.

In at least one aspect, the method further includes rupturing at least a portion of the second plurality of microcapsules during the thermal transfer printing.

In at least one aspect, the method further includes feeding the media element into an upstream end of an activation mechanism of the media processing device and rupturing at least a portion of the second plurality of microcapsules by passing the media element through the activation mechanism.

In at least one aspect, the activation mechanism is a second print head assembly.

In at least one aspect, the portion of the plurality of microcapsules are configured to be ruptured in response to a force greater than or equal to a predetermined threshold. In at least one aspect, the force includes at least one of a pressure force, a shear force, a frictional force, or a cutting force applied to the media element.

In at least one aspect, the portion of the plurality of microcapsules are ruptured based on a combination of (a) a force greater than or equal to a predetermined threshold applied to the media element and (b) a temperature of the at least the portion of the plurality of microcapsules being equal to or greater than a predetermined temperature threshold.

In at least one aspect, the transfer layer further includes a microcapsule panel including the plurality of microcapsules and an ink panel positioned adjacent the microcapsule panel.

In at least one aspect, the method further includes retracting the media element through the print head assembly from the downstream end toward the upstream end and printing a portion of the ink panel onto the media element by thermal transfer printing with the print head assembly.

In at least one aspect, the method further includes feeding the media element into an upstream end of a second print head assembly of the media processing device, wherein the second print head assembly comprises an ink thermal transfer ribbon comprising an ink transfer layer. In this aspect, the method further includes printing a portion of the ink transfer layer onto the media element by thermal transfer printing with the second print head assembly and feeding the media element out of a downstream end of the second print head assembly.

In at least one aspect, the thermal transfer ribbon further comprises a bursting additive proximate the plurality of microcapsules.

In yet another general aspect, the present disclosure provides a method of forming a thermal transfer ribbon. The method includes applying a release layer to a substrate and coating the release layer with a transfer layer. The transfer layer includes an environmental indicator material encapsulated in a plurality of microcapsules. The plurality of microcapsules preventing the environmental indicator material from producing an observable effect in response to exposure to a predetermined environmental condition. The environmental indicator material is released from the plurality of microcapsules in response to the plurality of microcapsules being ruptured. After the environmental indicator material is released and exposed to the predetermined environmental condition, the environmental indicator material produces the observable effect. The observable effect resulting from a change in the environmental indicator material from an original state to a second state in response to the predetermined environmental condition. The method further includes attaching a first end of the substrate to a supply spool, attaching a second end of the substrate to a take-up spool, and winding the substrate around the supply spool.

In at least one aspect, the method further includes drying the transfer layer onto the release layer.

In at least one aspect, coating the release layer with the transfer layer includes applying the transfer layer to a section of the release layer and spreading the transfer layer along the release layer with a drawdown rod.

In at least one aspect, the method further includes attaching an intermediate layer to the substrate opposite the release layer, wherein the intermediate layer comprises a bursting additive. In at least one aspect, the bursting additive comprises an abrasive material.

In at least one aspect, the method further includes attaching an intermediate layer to the substrate and attaching the release layer to the intermediate layer. The intermediate layer includes a bursting additive.

In at least one aspect, the transfer layer further includes a bursting additive.

In at least one aspect, the method further includes coating a bursting additive onto the substrate prior to applying the release layer to the substrate. In at least one aspect, the release layer is positioned against the bursting additive. In at least one alternative aspect, the release layer is positioned opposite the bursting additive.

FIGS. 1-7 illustrate a media processing device 300 that can be used to process media elements that include environmental sensors. FIG. 1 illustrates a media processing device 300 according to at least one aspect of the present disclosure. While the illustrated embodiments and description provided herein are directed primarily to a printing device, other media processing devices such as media encoders, magnetic stripe readers, RFID readers, label rewinders, card laminators, label applicators, or other devices may be part of the media processing device. For example, printing, encoding, and/or laminating functionality may be incorporated into a single media processing device.

The media processing device 300 of FIG. 1 includes a housing 301 and a base 303. The housing 301 may include a front panel 330, a rear panel 315, a side panel 302, and a support surface 310. The housing 301 may include a user interface 350 and a media exit 360. The media exit 360 may be arranged in the front panel 330 of the media processing device 300 and may be configured to expel media after it has been processed. The housing 301 may further include an access door assembly 320 including a major door 322 and a minor door 324. The major door 322 may be hingedly attached to the support surface 310 with hinges 340 and the minor door 324 may be hingedly attached to the major door 322. The access door assembly 320 of FIG. 1 is illustrated in the closed, operational position in which access to the internal components of the media processing device is precluded. In addition to keeping dirt, dust, and foreign objects from entering an internal cavity of the media processing device and potentially contaminating the consumables or the electronics of the processing device, the closed door may also reduce noise and prevent users from inadvertently touching sensitive components.

Figure 2:
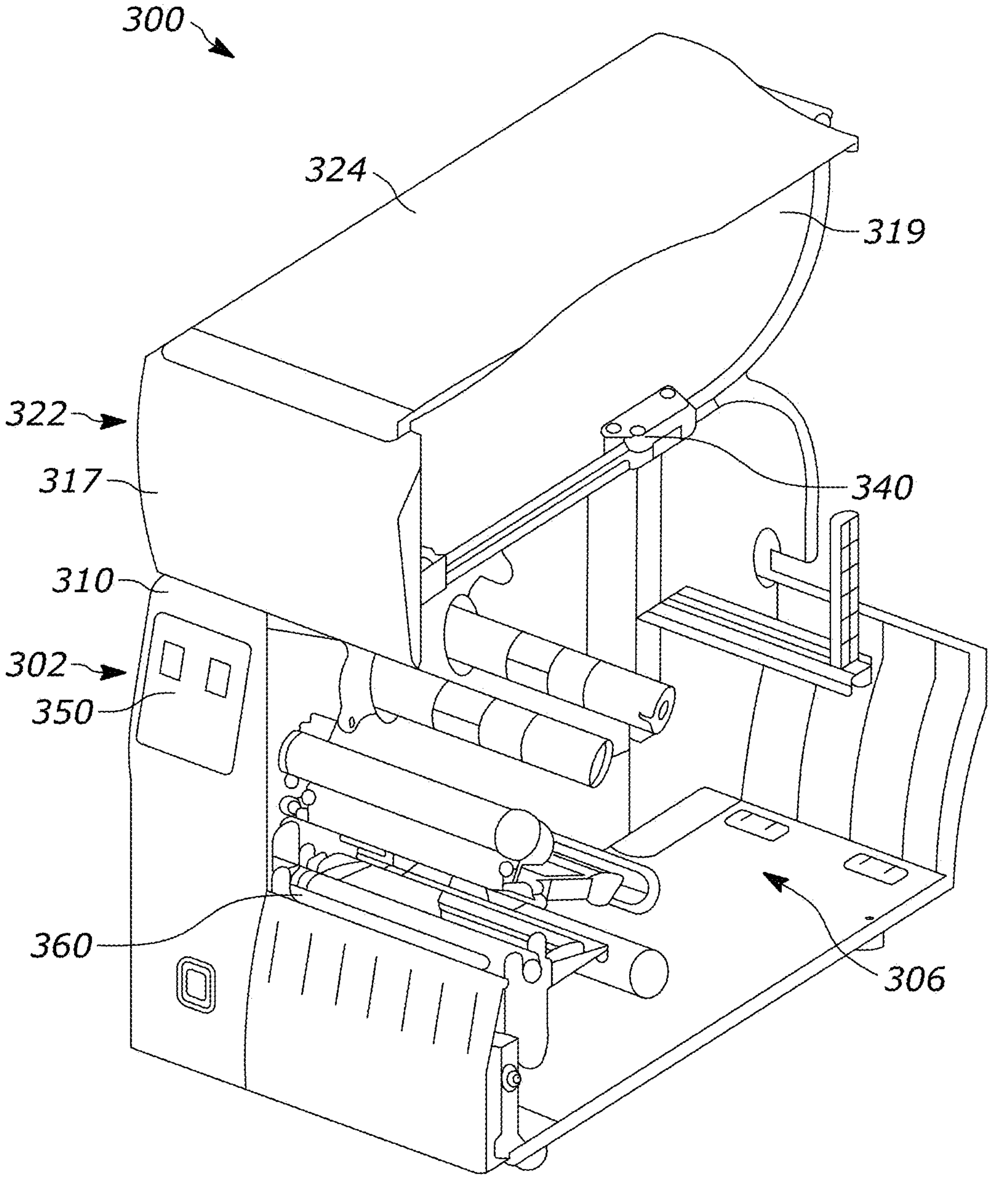
FIG. 2 illustrates the media processing device of FIG. 1 with an access door in an open position, according to at least one aspect of the present disclosure.

Referring to FIG. 2, positioning the hinges 340 proximate a centerline of the housing 301 allows the access door assembly 320 to pivot about hinges 340 and achieve the major support position when the major door 322 comes to rest on the support surface 310. Locating the hinges 340 proximate the centerline of the housing 301 further enables the side panel 302 of the media processing device to be situated against a surface, such as a wall or a cabinet, while still permitting the access door assembly 320 to achieve the major support position. The major door 322 may include at least a portion of the front panel 317 and/or a portion of the rear panel 319 to provide greater access to the interior cavity 306 when the major door is disposed in the major support position as will be described further below. In an alternative aspect, however, the major door 322 may include only a portion of the front panel.

The minor door 324 may be hingedly attached to the major door 322 and pivotable between an operational position (as shown in FIG. 1) and a minor support position (as shown in FIG. 2). In the operational position, the minor door 324 may be substantially co-planar with the access door assembly side 304 of the housing. In this operational position, the media processing device is ready for use and the internal cavity 306 is not accessible due to the position of the access door assembly 320. When the major door 322 is in the major support position, access to all of the necessary components to load and unload consumables (e.g. print media and printer ribbon) within internal cavity 306 is provided.

Figure 3:
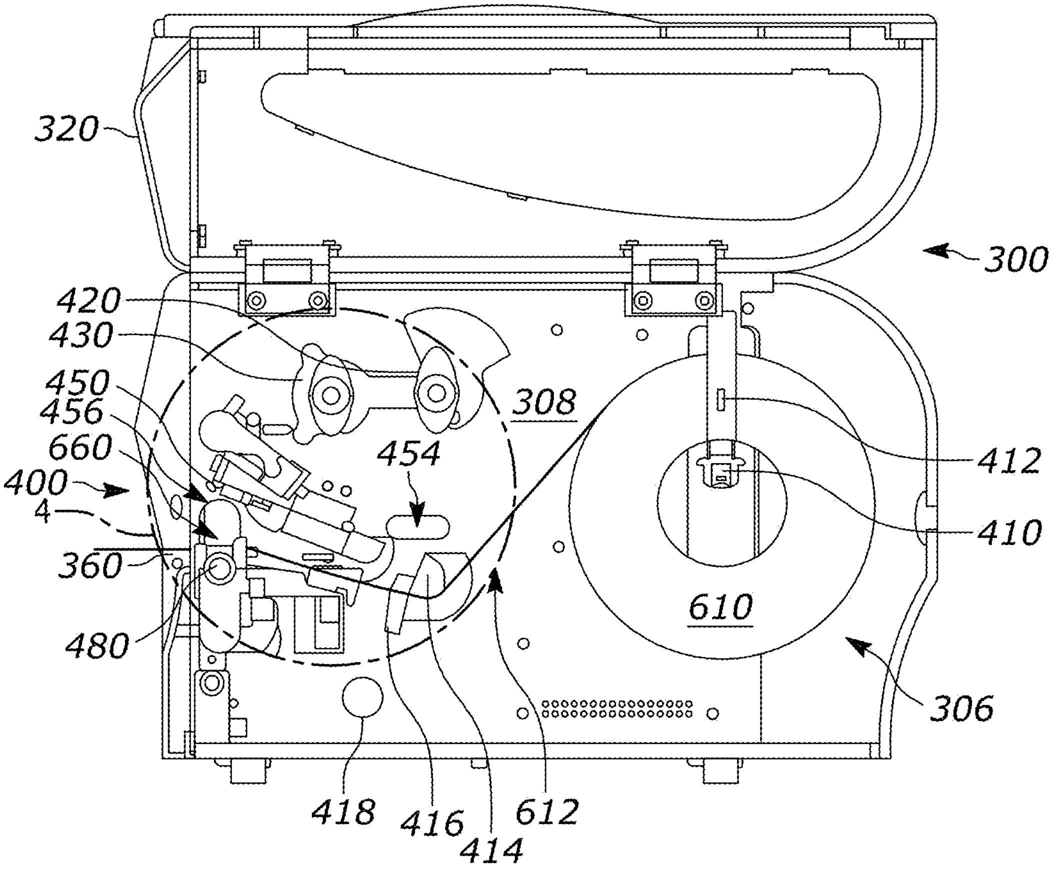
FIG. 3 illustrates a side view of the media processing device of FIG. 1 with a roll of media installed, according to at least one aspect of the present disclosure.
Figure 4:
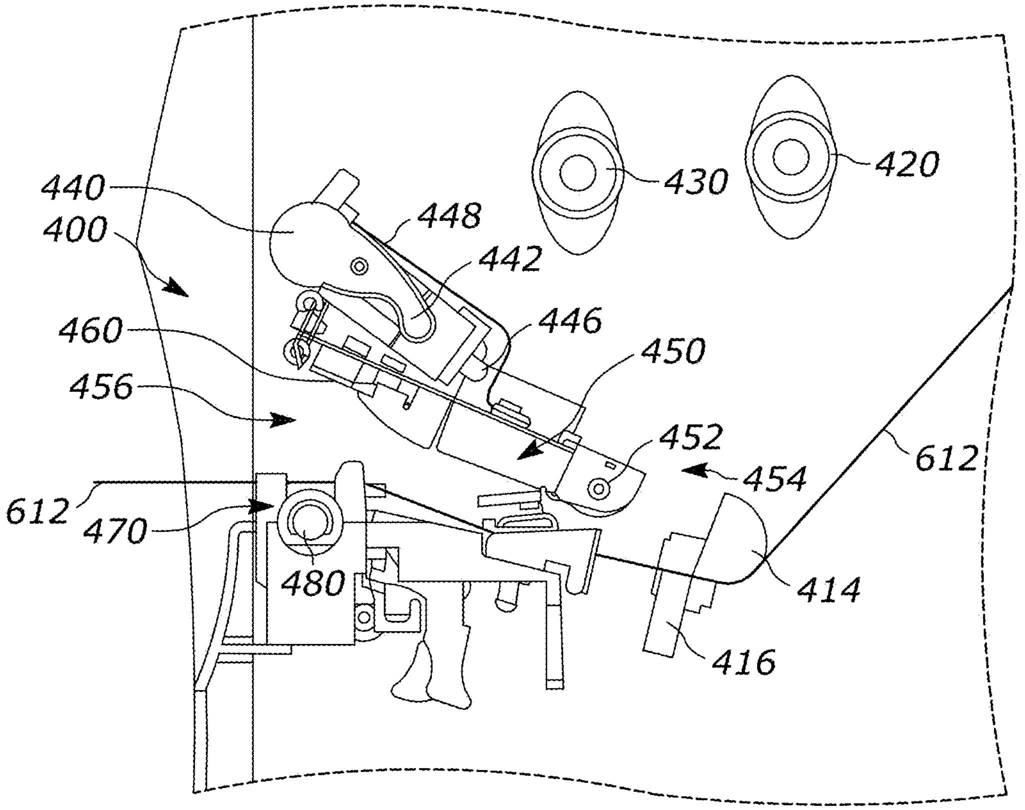
FIG. 4 illustrates a detailed view of a printing mechanism of the media processing device of FIG. 1 wherein the printing mechanism is disposed in a loading position, according to at least one aspect of the present disclosure.

Before a printing operation may begin, the print media must be loaded into the media processing device. FIG. 3 illustrates the media processing device 300 of FIG. 1 with a media supply roll 610 loaded on a media spindle or hanger 410. In at least one aspect, the media processing device 300 includes a media spindle alignment feature 412, a media guide 414, and a media sensor 416. The alignment feature 412 that may fold or rotate to a loading position, whereby a media supply roll 610 may be loaded onto the media spindle 410, and subsequently, the alignment feature 412 may fold or rotate back into engagement with the media supply roll 610 to maintain the media supply roll 610 in the proper position on the media spindle 410. The media supply roll 610 is positioned upstream of the print head assembly 450. For example, the media web 612 may extend from the media supply roll 610, through one or more guiding features, to the printing mechanism 400, i.e. printing assembly, and/or other processing components. In at least one aspect, the media web 612 extends from the media supply roll 610, around the media guide 414 and past the media sensor 416 to arrive at the print head assembly 450. A media element of the media web 612 is loaded into an upstream end 454 of the print head assembly 450.

In at least one aspect, the media processing device 300 can include a media input instead of a media supply roll 610. For example, a media element can enter into the media processing device through the media input and be loaded the upstream end 454 of the print head assembly 450. As another example, a media supply can be located outside of the media processing device and a media web of the media supply can extend through the media input and be loaded the upstream end of the print head assembly 450. In an alternative aspect, the media can be supplied from a media stack instead of a media roll (e.g. a stack of plastic cards or a fanfold web of tag stock).

The media sensor 416 may provide a signal to the printer electronics when the media web is present which may allow the printer to determine when printing may occur. The media sensor may be configured to read or otherwise sense the transition or delineation between individual media elements on the media web 612 to enable alignment of the image printed at the print line of the print head 460 relative to the edges of the media element. The media web 612 may extend along the print head assembly 450, between the nip defined by the print head 460 and the platen roller 480, and out through the media exit 360. As illustrated, when the print head assembly 450 is disengaged from the platen roller 480, a loading gap 660 is created between the print head 460 and the platen roller 480 which allows a user to more easily feed the media web 612 from the media supply roll 610, past the media sensor 416, and through the print mechanism to the media exit 360. Conventionally, if the print head 460 does not disengage from the platen roller 480, the structure of the platen/print head nip can present a conflict in that tight tolerances between the print head 460 and the platen roller 480 assist in printing, but such tolerances may make it difficult for a user to insert the media web 612 between the print head 460 and the platen roller 480 during loading of the media web 612 into the media processing device 300.

FIG. 3 illustrates a side view of the media processing device 300 of FIG. 1 with a media supply roll 610 installed, according to at least one aspect of the present disclosure. The major door 322 of the access door assembly 320 is in the major support position exposing the internal cavity 306 and the printer chassis 308. The printer chassis 308 is a structural member configured to support some or all of the internal components of the media processing device 300. The internal components within the internal cavity 306 may also include a ribbon supply spindle 420 and a ribbon take-up spindle 430. The ribbon supply spindle 420 may be configured to hold a spool of the unused portion of a ribbon while the ribbon take-up spindle 430 may be configured to hold a spool of the used portion of the ribbon. Also illustrated is the media exit 360 through which printed media exits the media processing device 300. The printer chassis 308 holds the media spindle 410, ribbon supply spindle 420, ribbon take-up spindle 430, and the printing mechanisms 400 in place within the internal cavity 306.

In at least one aspect, the printed media on the media web 612 can be collected on a take-up roller 418. In this aspect, the media web 612 extends around the platen roller 480 and down toward the take-up roller 418. For example, the take-up roller 418 can move as the platen moves to collect media printed on the media web 612. Once all the desired media is printed, the media on the take-up roller 418 can be removed for later use.

The printer chassis 308 may further hold a printing mechanism 400 as shown in detailed circle 4 which is further illustrated in FIGS. 4-7 depicting an enlarged view of the detailed circle 4 of FIG. 3. The printing mechanism 400 may include a print head assembly 450 including a print head 460, a platen assembly 470 including a platen roller 480, and a toggle assembly 440 including a toggle handle 442, biasing member 446, and a lift strap 448. The print head assembly 450 is illustrated in a loading position in FIG. 4 and a printing position in FIG. 5, both according to at least one aspect of the present disclosure. The print head 460 and the platen roller 480, when engaged, define a nip therebetween. In the printing position, the print head 460 engages the platen roller 480 along a print line.

The illustrated printing mechanism 500 may be configured for direct thermal printing by feeding a media element that includes a heat activated thermal coating through the nip and out the downstream end 456 of the print head assembly 450. The print head 460 is configured to supply heat to the media element causing the heat activated thermal coating to darken and show in specific locations on the media element. In at least one aspect, the print head 460 can heat the media element up to 300° C. Generally, the media element is heated to between 100° C.-120° C. during normal direct thermal printing operations.

The illustrated printing mechanism 400 may be configured for thermal transfer printing by feeding a media element and a printer ribbon through the nip and out the downstream end 456 of the print head assembly 450. The print head 460 may heat and compress the ribbon against the media element to deposit ink from the ribbon onto the media element. In at least one aspect, the print head 460 can heat the media element up to 300° C. Generally, the media element is heated to between 100° C.-120° C. during normal thermal transfer printing operations.

Figure 5:
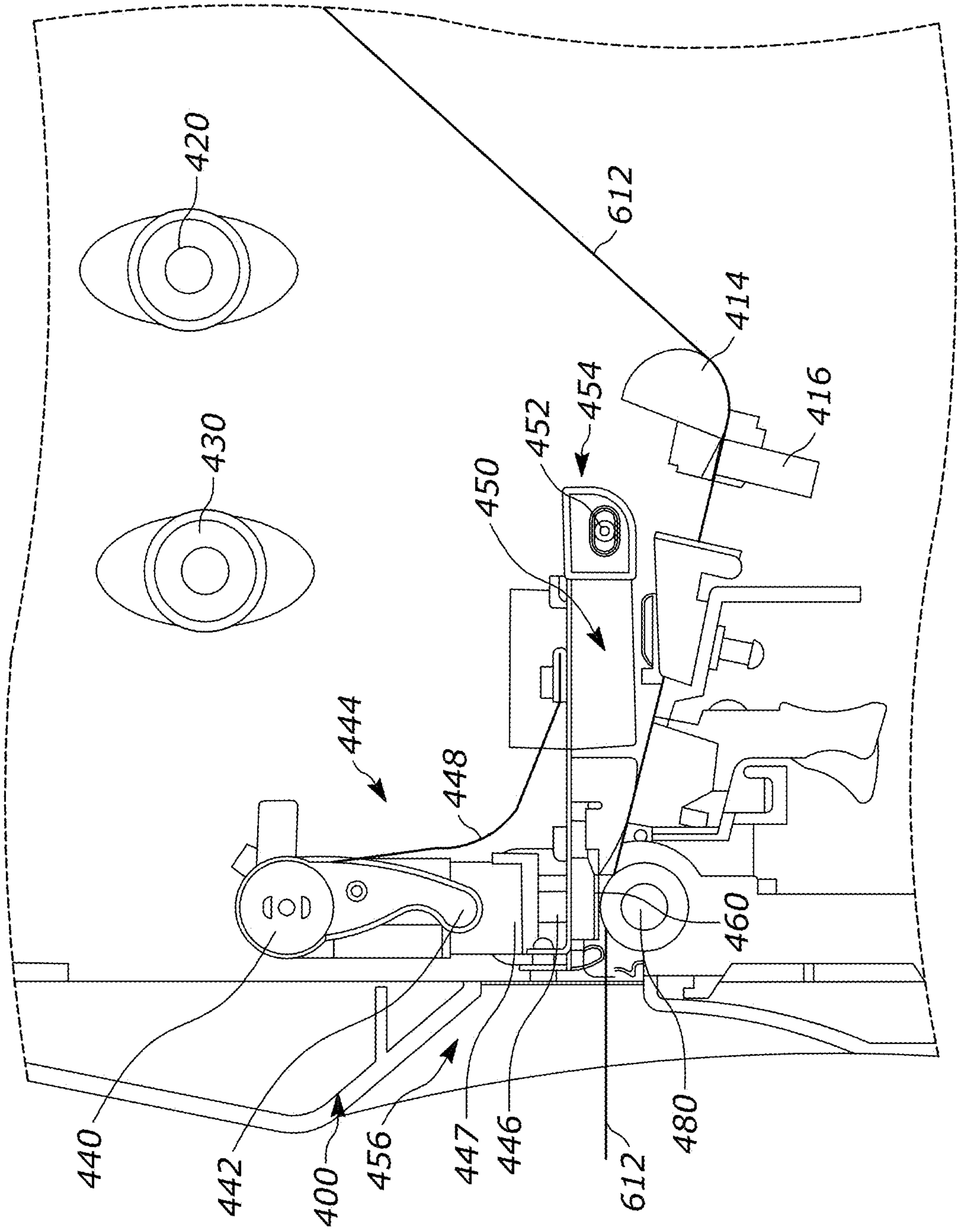
FIG. 5 illustrates a detailed view of the printing mechanism of FIG. 4, wherein the printing mechanism is disposed in a printing position, according to at least one aspect of the present disclosure.

In at least one aspect, the print head assembly 450 of the printing mechanism 400 is pivotably attached along axis 452 to the printer chassis 308. The print head assembly 450 includes the print head 460 which is mounted to the print head assembly 450 with a retention spring mechanism as will be further detailed below. The toggle assembly 440 is pivotally attached to the printer chassis 308 and is configured to be manually rotated by a user via handle 442 between a disengaged position (FIG. 4) and an engaged position (FIG. 5). As the toggle assembly 440 is rotated from the disengaged position to the engaged position along arrow 444, the driving elements 446 drive the print head assembly 450 into the printing position. The driving elements 446 may include a curved profile configured to slidably engage a surface of the print head assembly 450 as the toggle assembly 440 is rotated along arrow 444. The curved profile of the driving elements may provide a cam-type functionality which moves along the print head assembly 450 as the toggle assembly 440 is rotated and drives the print head assembly 450 into the printing position. Thus, the contact areas between the driving elements 446 and the print head assembly 450 may be configured to allow a sliding motion as the toggle assembly is rotated to the engaged position. Detents within the toggle assembly 440 are configured to retain the toggle assembly in either the engaged position or the disengaged position. When the toggle assembly 440 is in the engaged position, the driving elements 446 hold the print head assembly 450 in the printing position with the print head 460 engaged with the platen roller 480. In response to the toggle assembly being moved from the engaged position of FIG. 5 to the disengaged position of FIG. 4, the driving elements 446 are disengaged from the print head assembly 450 and the lift strap 448 is configured to raise the print head assembly 450 out of the printing position and into the loading position.

The driving elements 446 may be adjusted such that the amount of pressure applied to the print head assembly 450 in the engaged position is variable. In at least one aspect, the pressure can range from 2-15 pounds per square inch based on the adjustment. For example, normal printing operations generally require pressure in the range of 2-8 pounds per square inch. The adjustment mechanism may be arranged within adjustment members 447 wherein the adjustment members 447 are configured to be moved between pre-defined positions. The movement may be achieved by rotating an end of the adjustment member 447 which either extends or retracts the driving element 446 dependent upon the direction of rotation. The adjustment members may be configured with indicators of the pre-defined positions to which the adjustment mechanism may be moved. The pre-defined positions may be indicated by figures, numbers, or other indicia that allows a user to easily interpret the effect of the adjustment (e.g., more pressure or less pressure). Further, embodiments which include multiple driving elements 446 may include an adjustment member 447 for each driving element 446. The pre-defined positions with marked indicia may be used to adjust the driving elements 446 to the same, or possibly different positions, resulting in different levels of pressure applied across the print head assembly 450 by the driving elements 446. Adjusting the driving elements 446 to a longer length results in greater pressure applied to the print head assembly 450, thereby increasing the pressure of the print head 460 against the platen roller 480. The adjustable driving elements 446 enable a user to adjust the print head pressure to optimize the print quality. In at least one aspect, the adjustable driving elements 446 may be adjusted manually by a user. In an alternative aspect, the adjustable driving elements 446 may be adjusted by motors coupled to a control circuit. In this aspect, the control circuit adjusts the driving elements based on an input.

The lift strap 448 may be attached at one end to the toggle assembly 440 and at the other end to the print head assembly 450. The lift strap 448 may be made of any flexible, high-tensile strength material with low elasticity, for instance a polyester film. In response to the toggle assembly 440 being moved from the engaged position of FIG. 5 to the disengaged position of FIG. 4, the toggle assembly 440 lifts the lift strap 448 to raise the print head assembly 450 from the printing position to the loading position. Further, the lift strap 448 suspends the print head assembly 450 in the loading position while the toggle assembly 440 is in the disengaged position.

Figure 6:
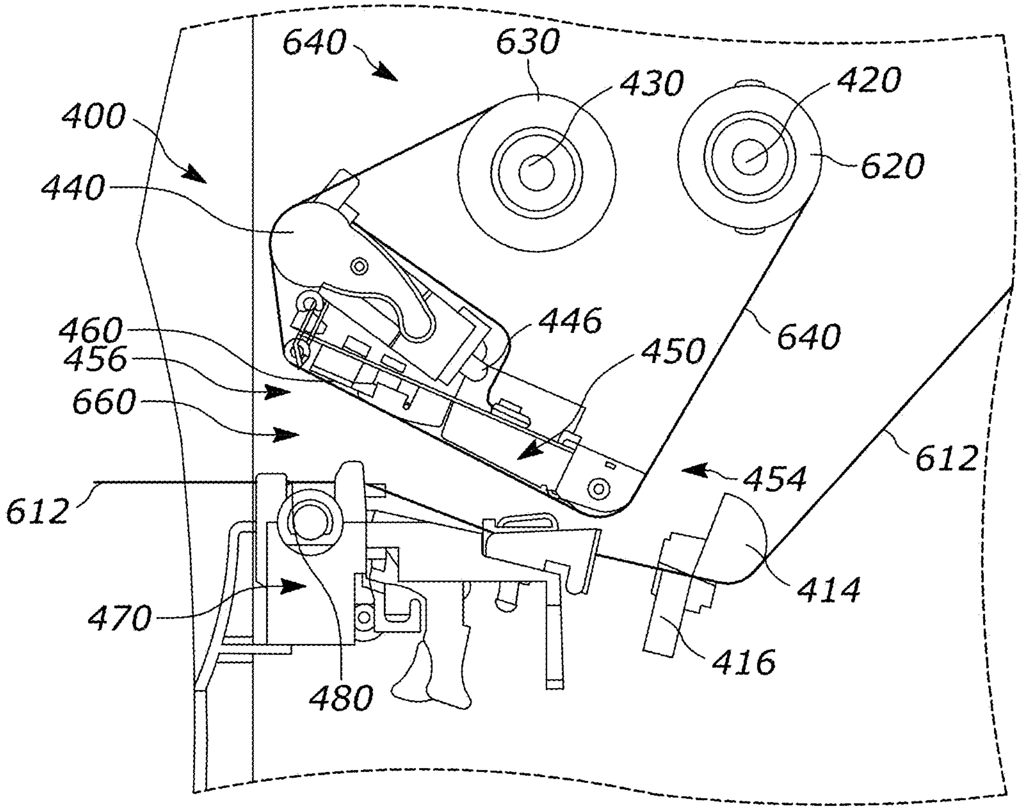
FIG. 6 illustrates a detailed view of the printing mechanism of FIG. 4, wherein the printing mechanism is disposed in the loading position and a ribbon has been installed, according to at least one aspect of the present disclosure.

Thermal transfer printers use an ink ribbon that contains ink disposed on a substrate, where the ink is transferred to a media substrate of a media element via pressure and heat. Media processing devices according to example embodiments of the present invention may use any number of types of ribbons including dye ribbons, hologram ribbons, security material ribbons, and UV coating ribbons, among others. Therefore, in addition to the media substrate being loaded and aligned between the print head assembly 450 and the platen roller 480, the ink ribbon 640 must be similarly inserted between the print head 460 and the platen roller 480. FIG. 6 illustrates the printing mechanism 400 with a printer ribbon installed, according to at least one aspect of the present disclosure. The ink ribbon 640 includes a supply spool 620 and a take-up spool 630, each disposed on a respective spindle. The ink ribbon 640 is fed along an ink ribbon path extending from the supply spool 620, around the print head assembly 450, and past the print head 460. The ink ribbon 640 makes a relatively sharp upward transition after the print head 460 toward the toggle assembly 440, around which the ink ribbon bends to arrive at the take-up spool 630. The relatively sharp transition after the print head 460 provides a peel-mechanism whereby the ink ribbon is lifted from the media substrate at a sharp angle to reduce the flash or excess ink that may surround a printed image.

Figure 7:
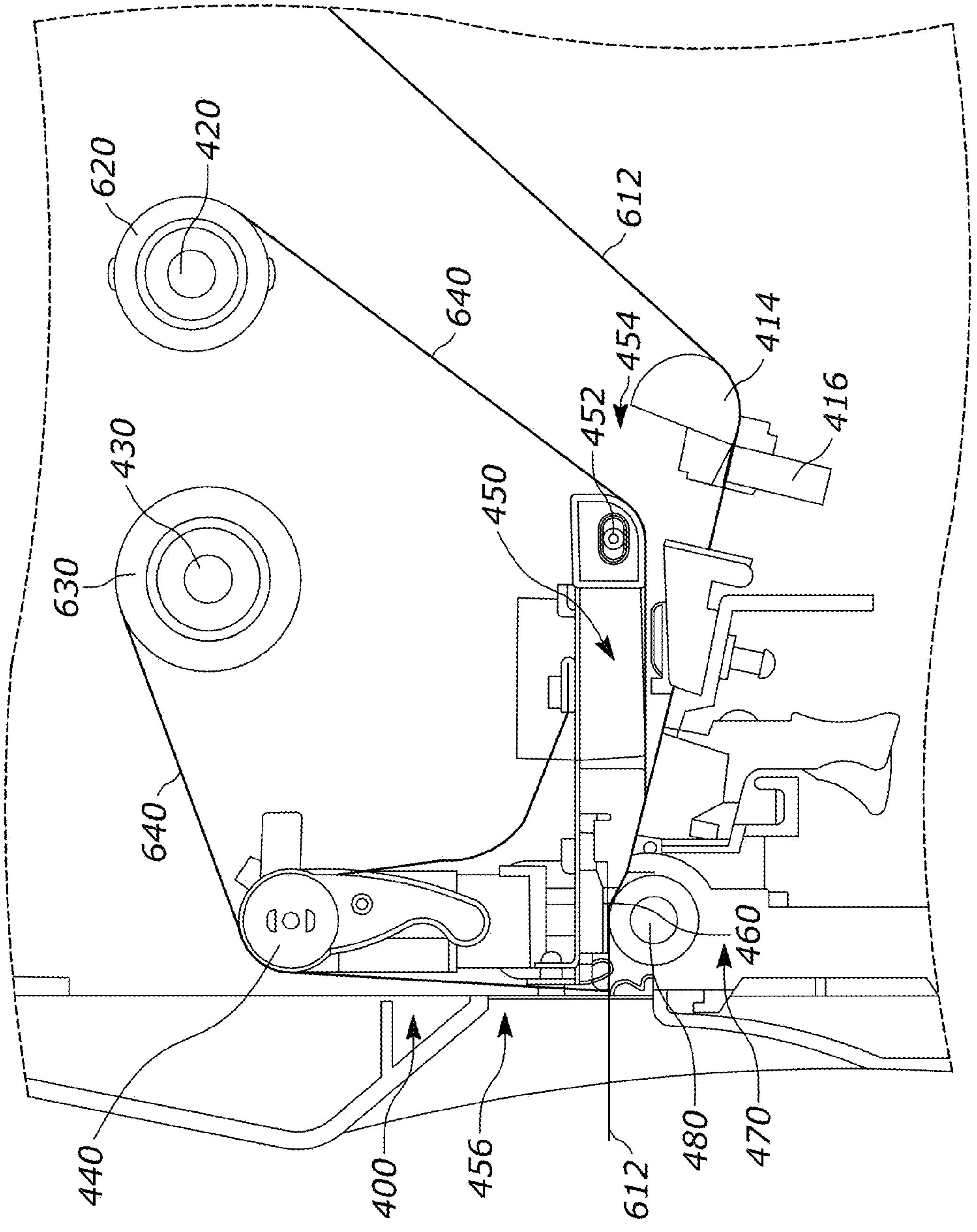
FIG. 7 illustrates a detailed view of the printing mechanism of FIG. 6, wherein the printing mechanism is disposed in the printing position, according to at least one aspect of the present disclosure.

FIG. 6 illustrates the ink ribbon 640 installed onto the print mechanism and properly routed past the print head 460. As illustrated, the loading gap 660 created when the print head assembly 450 is disengaged from the platen roller 480 allows the ink ribbon 640 to be easily routed and aligned to the print head assembly 450. FIG. 7 illustrates the ink ribbon 640 as installed with the print head assembly 450 in the engaged position, according to at least one aspect of the present disclosure. As depicted, the path from the supply spool 620 to the take-up spool 630 is longer when the print head assembly 450 is in the printing position such that when the toggle assembly 440 is moved from the loading position to the printing position, tension is applied to the ink ribbon 640. The tension applied to the ink ribbon 640 is desirable and ensures that the ink ribbon 640 lays flat against the print head 460. Further, the tension applied to the ink ribbon 640 provides more consistent and repeatable alignment of the ribbon.

To perform a thermal transfer printing process, a media element of the media web 612 and an ink ribbon 640 are fed through the nip and out the downstream end 456 of the print head assembly 450. During the thermal transfer printing process, the print head 460 and platen roller 480 compress the ink ribbon 640 against the media element and the print head 460 provides heat to desired sections to deposit ink from the ink ribbon 640 at those desired sections onto the media element.

Figure 8:
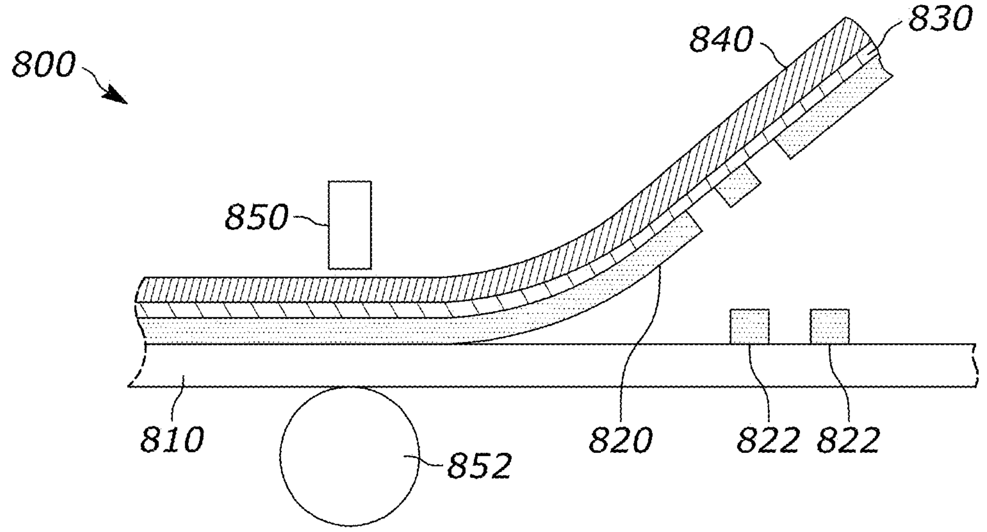
FIG. 8 illustrates a diagram of a thermal transfer printing process, where ink is printed onto a printable substrate, according to at least one aspect of the present disclosure.

FIG. 8 illustrates a diagram of a thermal transfer printing process, where ink 822 is printed onto a printable substrate 810 (e.g. a media element 100 of the media web 612), according to at least one aspect of the present disclosure. An ink thermal transfer ribbon 800 is positioned between a thermal element 850 (e.g. print head 460) and a roller 852 (e.g. platen roller 480). The ink thermal transfer ribbon 800 is positioned such that an ink layer 820 is positioned against the printable substrate 810. In at least one aspect, the ink layer 820 is attached to a ribbon substrate 840 (i.e. carrier layer) by a release layer 830. The release layer 830 facilitates the removal of ink from the ribbon substrate 840 when heat is applied by the thermal element 850. The ribbon substrate 840 allows heat from the thermal element 850 to transfer to the release layer 830 and ink layer 820. The heating element 850 and the roller 852 compress the printable substrate against the ink thermal transfer ribbon 800. As heat is applied to the ink thermal transfer ribbon 800 by the thermal element 850, a portion of the ink layer 820 is transferred to the printable substrate 810 as transferred ink 822.

Figure 9:
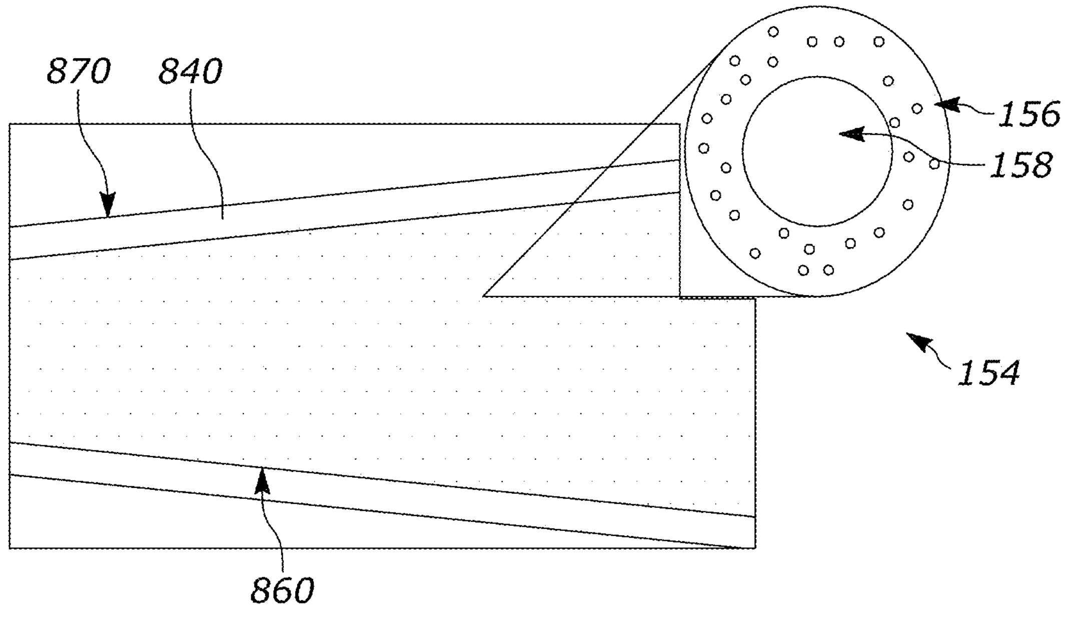
FIG. 9 illustrates microcapsules coated onto a ribbon substrate forming an encapsulated indicator thermal transfer ribbon, according to at least one aspect of the present disclosure.

Microcapsules encapsulating an indicator material 158 can be placed on a media element 100 through a thermal transfer printing process. Media element 100 is one non-limiting example of a media element. Some examples of media elements 100 that can include the encapsulated indicator material 158 can include, for example, labels, tags, wristbands, inlays, plastic cards, etc. For example, the microcapsules can be placed on the surface of a media element 100 similar to an ink thermal transfer printing process. FIG. 9 illustrates microcapsules 154 coated onto a ribbon substrate forming an encapsulated indicator thermal transfer ribbon 870, according to at least one aspect of the present disclosure. There are various methods to coat the microcapsules 154 onto a ribbon substrate 840 (e.g. hot melt methods, solvent-based methods, etc). Depending on the core and shell construction, there are advantages to each method of coating a ribbon substrate 840.

One method is a drawdown coating method. The method includes applying microcapsules 154 along an entire width of a section of the release layer 830 of the indicator thermal transfer ribbon 870 and then spreading the microcapsules 154 along the indicator thermal transfer ribbon 870 with a drawdown rod. The drawdown rod spreads the microcapsules 154 along the indicator thermal transfer ribbon 870 to a thickness to form a transfer indicator layer 860 of the microcapsules 154. The microcapsules can be directly or indirectly releasably adhere or attach to the release layer 830 of the indicator thermal transfer ribbon 870. In at least one aspect, the microcapsules 154 are added to a resin layer, a wax layer, or a wax/resin blend layer and applied to the release layer 830 using the drawdown coating method. In certain aspects other methods of manufacture may be used. For example, flexographic printing cylinders and rollers may be used to coat material onto a ribbon substrate, then ribbons may be cut and wound for loading into a printer. Retransfer methods may also be used, such as ink jetting material onto a ribbon substrate or depositing material on a ribbon substrate using a thermal transfer apparatus immediately prior to commencing the thermal transfer printing process.

The microcapsules 154 each have a shell 156 that encapsulates an environmental indicator material 158. After the environmental indicator material 158 is exposed to a predetermined environmental condition, then the environmental indicator material 158 changes from an initial material state to a second material state producing an observable effect. In at least one aspect, the change in material state from an initial material state to a second material state is a change in a property of the material, e.g. a state of matter, electrical conductivity, color attributes, and etc.

In at least one aspect, the microcapsules 154 prevent the observable effect from occurring in the environmental sensor by protecting the environmental indicator material 158 from exposure to the predetermined environmental condition. For example, the environmental indicator material 158 can stay in the initial material state even if the microcapsules 154 are exposed to the predetermined environmental condition. However, after the microcapsules 154 are ruptured, the environmental indicator material 158 is released and any change in the material state of the environmental indicator material 158 upon exposure to the predetermined environmental condition can cause the observable effect to be produced by the environmental sensor 150. In an additional or alternative aspect, the microcapsules 154 prevent the observable effect from occurring in response to the predetermined environmental condition by containing the environmental indicator material 158 when it changes material state. For example, the environmental indicator material 158 can change material states within the microcapsule 154 but the observable effect can be prevented until the microcapsules 154 are ruptured releasing the environmental indicator material 158 and the released environmental indicator material 158 is exposed to the predetermined environmental condition (e.g., by preventing movement of the material when it liquefies, or by hiding a color change of the material).

In at least one aspect, a diameter of each microcapsule 154 is between 20 μm to 250 μm. The shell 156 thickness of each microcapsule 154 can range between 5 μm to 25 μm. The shell 156 of the microcapsules 154 can be made of a variety of materials, e.g. urea formaldehyde, gelatin, protein, melamine, polyurea formaldehyde, gel, polymelamine formaldehyde, wax material, emulsions, etc. For example, polymelamine and polyurea formaldehyde are both used for encapsulations by interfavial polymerization which uses two immiscible phases. Once separated in the same vessel, a reaction is initiated at the interface of the two immiscible phases in the presence of an initiator and the material to be encapsulated. As polymerization occurs, microcapsules form around the core material. The microcapsules 154 release the environmental indicator material 158 upon rupturing the microcapsules 154.

Figure 10:
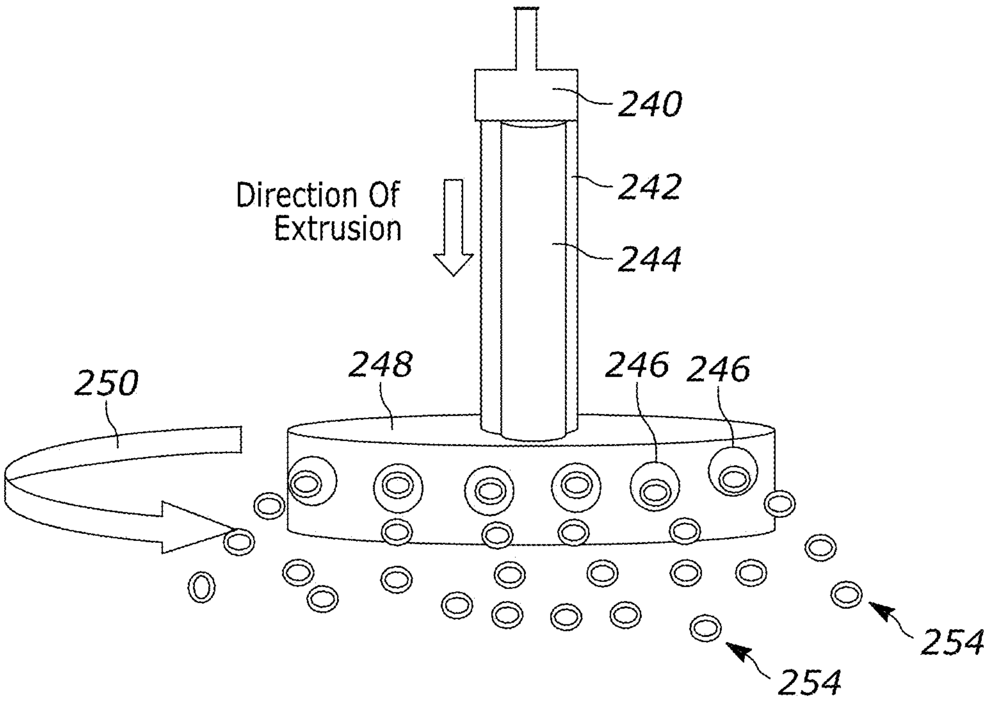
FIG. 10 illustrates a diagram of a method for creating microcapsules filled with an environmental indicator material, according to at least one aspect of the present disclosure.

There are many methods to create a microcapsule encapsulating an environmental indicator material 158. FIG. 10 illustrates a diagram of a method for creating microcapsules 254 filled with a core material 244 (e.g. an environmental indicator material 158), according to at least one aspect of the present disclosure. The method involves emulsifying core materials 244 into an outer shell material 242. The core material 244 and outer shell material 242 are pumped into the center of a disk 248. The core material 244 is surrounded by the outer shell material 242 as it enters the disk. The disk 248 has nozzles 246 on an exterior surface of the disk 248. The nozzles 246 are connected to the center of the disk 248. The disk is rotated in a direction (e.g. direction 250) to produce microcapsules 254 with a narrow particle size distribution. The microcapsule 254 size can be controlled by altering the rotation speed of the disk to produce larger or smaller particles. The microcapsules 254 have an outer shell material 242 that surrounds a core material 244. In at least one aspect, the method illustrated by FIG. 10 is used to create microcapsules 154.

Figure 11:
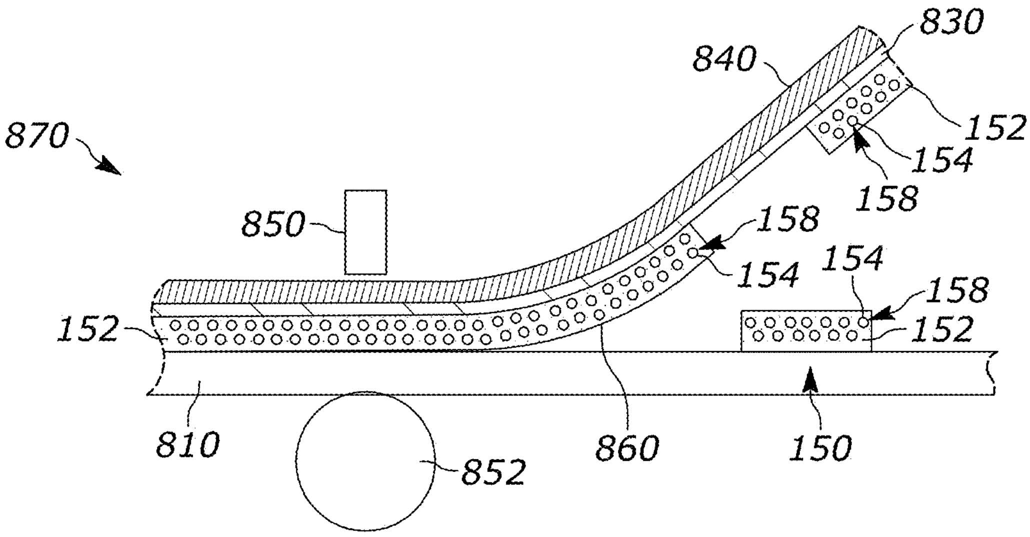
FIG. 11 illustrates a diagram of a thermal transfer printing process, where an environmental sensor is printed onto a printable substrate, according to at least one aspect of the present disclosure.

FIG. 11 illustrates a diagram of a thermal transfer printing process, where an environmental sensor 150 is printed onto a printable substrate 810 (e.g. a media element 100 of the media web 612), according to at least one aspect of the present disclosure. An indicator thermal transfer ribbon 870 is positioned between the thermal element 850 (e.g. print head 460) and the roller 852 (e.g. platen roller 480). The indicator thermal transfer ribbon 870 is positioned such that an encapsulated indicator layer 860 is positioned against the printable substrate 810. In at least one aspect, the encapsulated indicator layer 860 includes microcapsules 154 surrounded by a carrier material 152 (e.g. a wax material, a resin material, a wax/resin blend material, an adhesive, or etc.). In an alternative aspect, the encapsulated indicator layer 860 includes the microcapsules 154 without a carrier material 152. In this aspect, the microcapsules 154 are attached directly to a ribbon substrate 840 (e.g., by an adhesive). For example, the microcapsules can have an additional outer shell that acts as a “release” layer. These microcapsules could be applied to the ribbon substrate 840 by a solvent-drying approach, where the microcapsules 154 are sprayed and dried to the ribbon substrate 840.

In at least one aspect, the encapsulated indicator layer 860 is attached to the ribbon substrate 840 (i.e. carrier layer) by a release layer 830. The release layer 830 facilitates the removal of the encapsulated indicator material 158 from the ribbon substrate 840 when heat is applied by the thermal element 850. The ribbon substrate 840 allows heat from the thermal element 850 to transfer to the release layer 830 and encapsulated indicator layer 860. The heating element 850 and the roller 852 compress the printable substrate against the indicator thermal transfer ribbon 870. As heat is applied to the indicator thermal transfer ribbon 870 by the thermal element 850, a portion of the encapsulated indicator layer 860 is transferred to the printable substrate 810 forming an environmental sensor 150.

Figure 12:
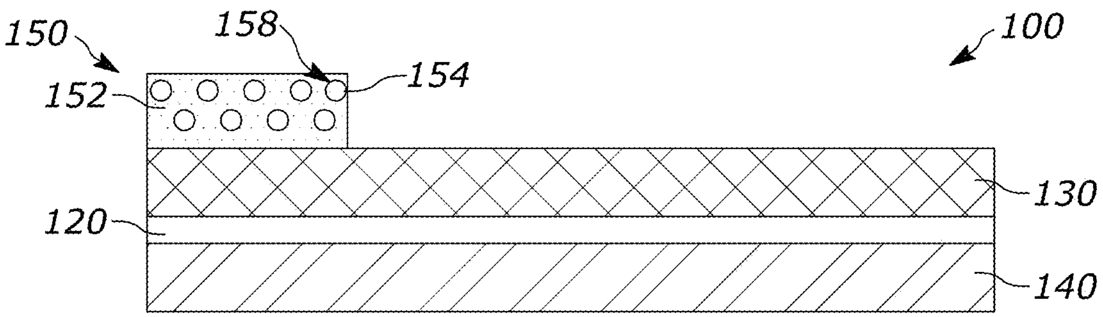
FIG. 12 illustrates a diagram of a cross-section of an example media element that had an environmental sensor printed on a printable substrate through a thermal transfer printing process, according to at least one aspect of the present disclosure.

FIG. 12 illustrates a diagram of a cross-section of an example media element 100 that has an environmental sensor 150 printed on a printable substrate through a thermal transfer printing process, according to at least one aspect of the present disclosure. The media element 100 includes a printable substrate made of layers attached to each other with adhesive layers 120 (e.g., a face sheet layer composed of face sheet 130 material and a release layer composed by a release liner 140). FIG. 12 shows the microcapsules 154 encapsulating an indicator material 158 attached to the face sheet 130. In at least one aspect, the microcapsules 154 form an environmental sensor 150 on the media element 100. In some aspects, the environmental sensor 150 further includes the carrier material 152 surrounding the microcapsules 154. The carrier material 152 can allow the microcapsules 154 to be placed onto the face sheet 130 of the printable substrate through the thermal printing process. In at least one aspect, the microcapsules can have an additional outer shell that acts as a “release” layer.

In some aspects, a release liner 140 is selectively detachable from the media element 100 to expose one of the adhesive layers 120, which can include an adhesive that can be used to affix the media element 100 to an object. In an alternative aspect, the media element 100 is liner-less and does not include the release liner 140. In at least one aspect, the media element 100 includes a layer that is a face sheet 130. In at least one aspect, the face sheet 130 material is a paper material, polyester material, thermoplastic and/or vinyl polymer materials, such as polypropylene, polyethylene, polyethylene terephthalate, nylon, and/or Tyvek®, and/or any combination thereof. The media element 100 can be printed on through a thermal transfer printing process. In some aspects, the media element 100 includes a layer with a heat activated thermal coating (e.g., the face sheet 130 can include the heat activated thermal coating), which allows the media element 100 to be printed on using a direct thermal printing process. In some aspects, the media element 100 can include the face sheet 130 and the environmental sensor 150 and can be devoid of the adhesive layer 120 between the release liner 140 and the face sheet 130 and/or can be devoid of the release liner 140. Some examples of media elements 100 that can include the encapsulated indicator material 158 are labels, tags, wristbands, inlays, plastic cards, and etc.

Figure 13:
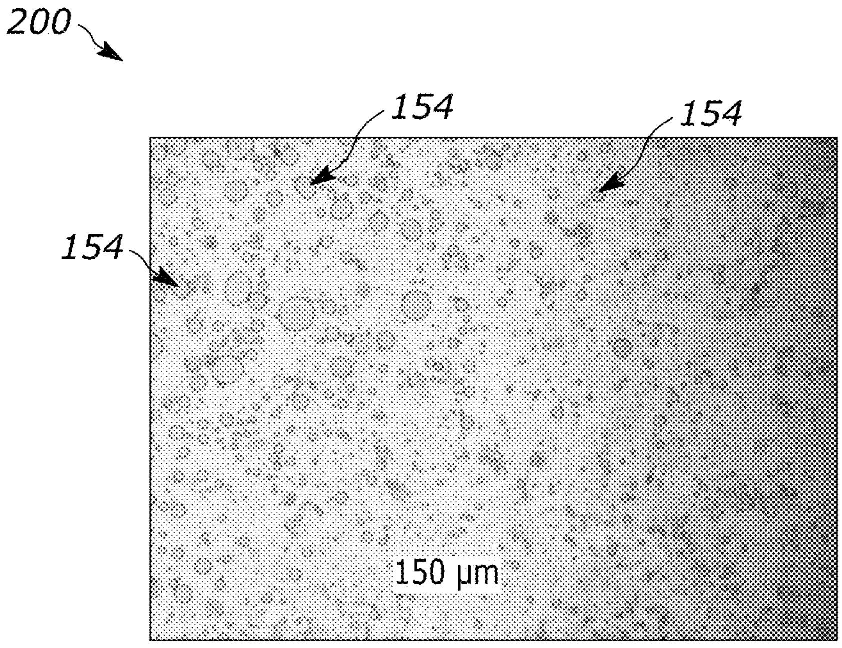
FIG. 13 illustrates an example view of microcapsules of an environmental sensor on a media element, where the environmental sensor is in the non-activated configuration, according to at least one aspect of the present disclosure.
Figure 14:
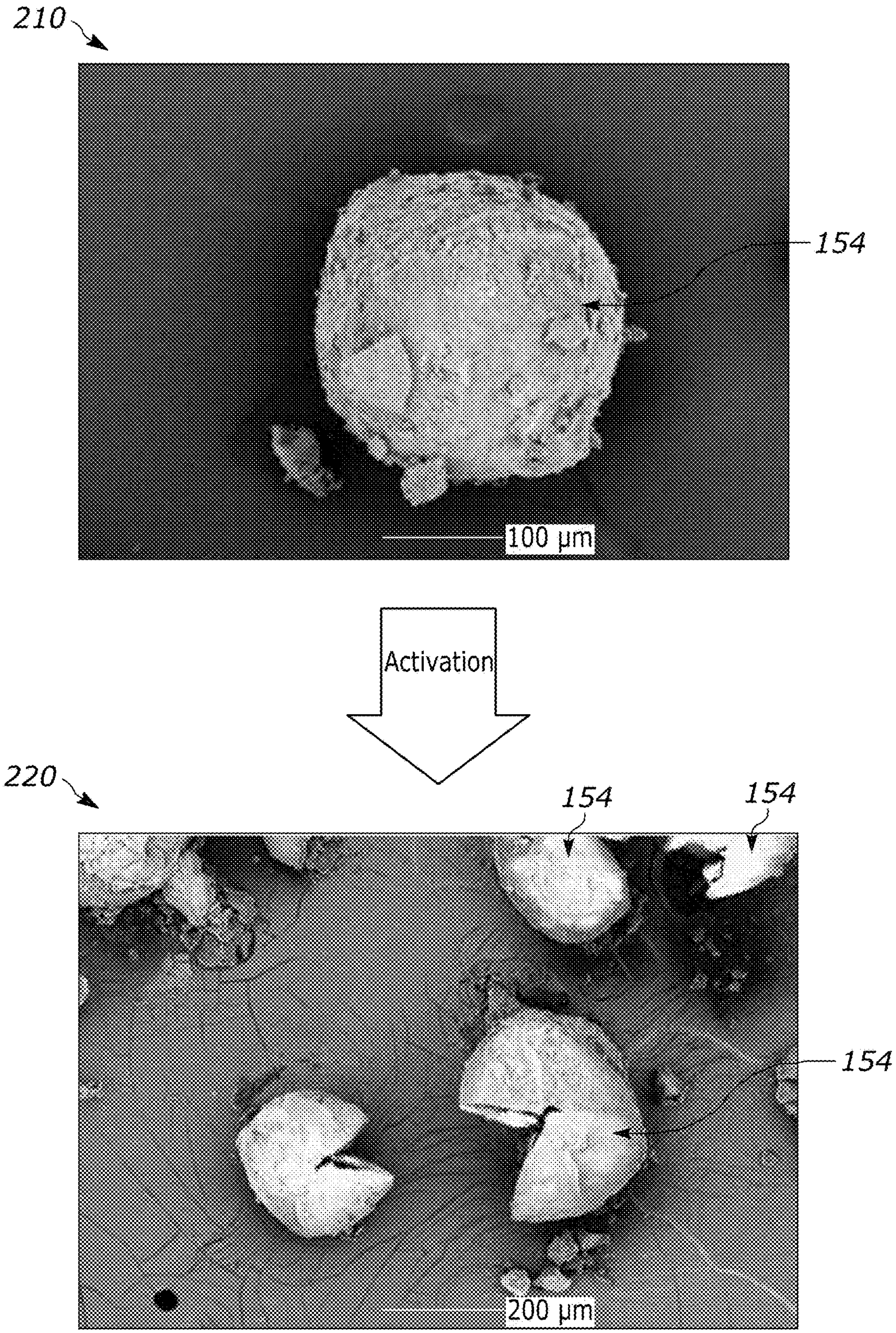
FIG. 14 illustrates a microcapsule rupturing after an activation process, according to at least one aspect of the present disclosure.
Figure 15:
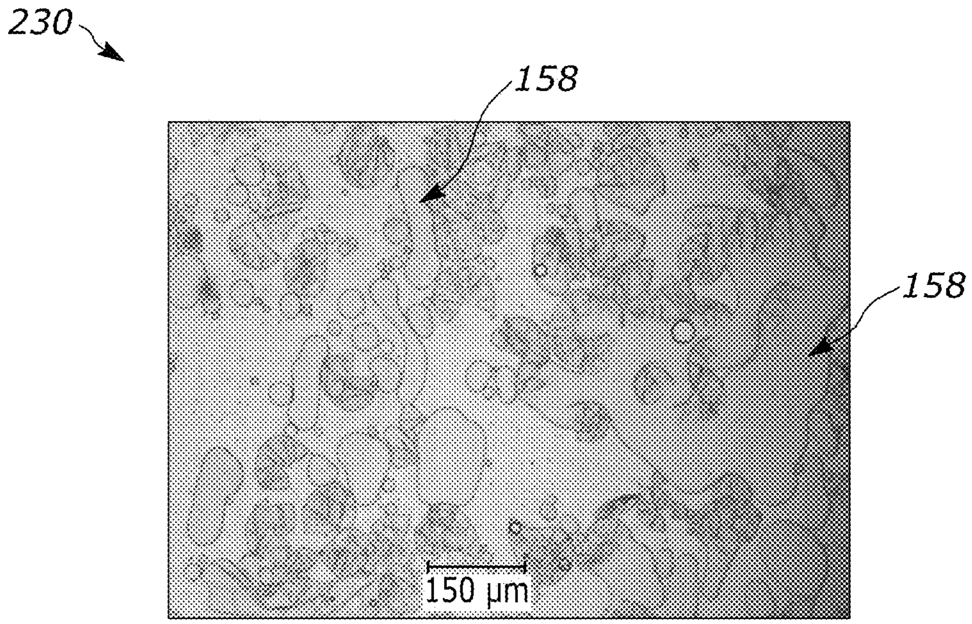
FIG. 15 illustrates an example view of microcapsules of an environmental sensor on a media element, where the environmental sensor is in the activated configuration, according to at least one aspect of the present disclosure.

FIG. 13 illustrates an example view 200 of microcapsules 154 of the environmental sensor 150 on the media element 100, according to at least one aspect of the present disclosure. The environmental sensor 150 in FIG. 9 is in the non-activated configuration. FIG. 14 illustrates a microcapsule 154 rupturing after an activation process, according to at least one aspect of the present disclosure. The view 210 illustrates a microcapsule 154 before activation and view 220 illustrates a ruptured microcapsule 154 after activation that released the environmental indicator material 158. FIG. 15 illustrates an example view 230 of microcapsules 154 of the environmental sensor 150 on the media element 100, according to at least one aspect of the present disclosure. The environmental sensor 150 in FIG. 15 is in the activated configuration due to at least a portion of the microcapsules 154 having ruptured. As shown in FIG. 15 the environmental indicator material 158 has spread out and can experience the predetermined environmental condition outside of the microcapsules 154. In at least one aspect, the environmental indicator material 158 experiences the predetermined environmental condition and then the environmental indicator material 158 changes from an initial material state to a second material state producing an observable effect.

In at least one aspect, at least a portion of the microcapsules 154 are ruptured based on a force applied to the microcapsules 154, where the force exceeds or equals a predetermined threshold. In at least one aspect, the force applied during the thermal transfer printing process causes the microcapsules 154 to rupture. In an alternative aspect, the microcapsules 154 are configured to not rupture under the forces applied during the thermal transfer printing process. The value of the predetermined threshold is based on the microcapsule material, thickness of the microcapsules 154, and/or the diameter of the microcapsules 154. The force can be a pressure force, a shear force, a frictional force, and/or a cutting force that cause at least a portion of the microcapsules 154 to rupture. In at least one aspect, the force is a pressure force and the predetermined threshold is between 1.5 pounds per square inch and 8 pounds per square inch. In an alternative aspect, the force is a pressure force and the predetermined threshold is between 4 pounds per square inch and 15 pounds per square inch. In yet another alternative aspect, the force is a pressure force and the predetermined threshold is between 16 pounds per square inch and 21 pounds per square inch. In general, a media processing device 300 can apply a pressure of up to 15 pounds per square inch to a media element 100 with the pressure force normally being between 2-8 pounds per square inch during a normal thermal transfer printing operations.

In at least one aspect, the portion of the microcapsules 154 are ruptured based on a temperature of the microcapsules 154, where the temperature of the microcapsules 154 exceeds or is equal to a predetermined temperature threshold. For example, temperature increases can cause the microcapsules 154 to rupture. In at least one aspect, the temperature reached during the thermal transfer printing process causes the microcapsules 154 to rupture. In general, a minor amount of force would also be applied to the microcapsules 154 for example during the thermal transfer printing process. In an alternative aspect, the microcapsules 154 can be configured to not rupture under the thermal transfer printing process and require a temperature greater than the temperature reached during the thermal transfer printing process. The value of the predetermined temperature threshold is based on the microcapsule material, the thickness of the microcapsules 154, and/or the diameter of the microcapsules 154. In at least one aspect, the predetermined temperature threshold is between 90° C. and 110° C. In an alternative aspect, the predetermined temperature threshold is between 90° C. and 250° C. In general, the print head 460 of the media processing device 300 can heat the media element 100 up to 300° C. with the media element 100 normally being heated to between 100° C.-120° C. during normal thermal transfer printing operations.

In at least one aspect, at least a portion of the microcapsules 154 are ruptured based on both a force applied to the microcapsules 154 and a temperature of the microcapsules 154, where the force exceeds or equals a predetermined threshold and the temperature of the microcapsules 154 exceeds or is equal to a predetermined temperature threshold. The force can be a pressure force, a shear force, a frictional force, or a cutting force that cause at least a portion of the microcapsules 154 to rupture. In at least one aspect, the predetermined temperature threshold is between 90° C. and 250° C., the force is a pressure force, and the predetermined threshold is between 4 pounds per square inch and 15 pounds per square inch. In an alternative aspect, the predetermined threshold is between 1.5 pounds per square inch and 8 pounds per square inch.

In at least one aspect, each microcapsule 154 of the microcapsules 154 has a first shell wall and a second shell wall encapsulating the environmental indicator material 158. For example, the first shell wall surrounds the environmental indicator material 158 and the second shell wall surrounds the first shell wall. Stated another way, there are two coating to each microcapsule 154 that surround the environmental indicator material 158. The first shell wall is configured to rupture based, in part, on a temperature being equal to or greater than a predetermined temperature threshold. The second shell wall is configured to rupture based on a force equal to or greater than a predetermined threshold being applied to the microcapsules 154. As discussed above, the force can be a pressure force, a shear force, a frictional force, or a cutting force that causes at least a portion of the microcapsules 154 to rupture. In this aspect, both heat and a force would need to be applied to the microcapsules 154 for at least a portion of the microcapsules 154 to rupture.

As discussed above, the microcapsules 154 are configured to rupture in response to force and/or heat, and contain environmental indicator materials 158, e.g., the microcapsules described in the commonly owned applications: U.S. patent application Ser. No. 18/369,498, filed on Sep. 18, 2023, titled "PRINTER ACTIVATABLE ENVIRONMENTAL SENSING THROUGH CHEMICAL ENCAPSULATION"; and U.S. patent application Ser. No. 18/369,506, filed on Sep. 18, 2023, titled "USE OF ENCAPSULATED POLAR PROTIC CHEMISTRIES FOR RFID TEMPERATURE MONITORING", both filed concurrently with this application.

Figure 16:
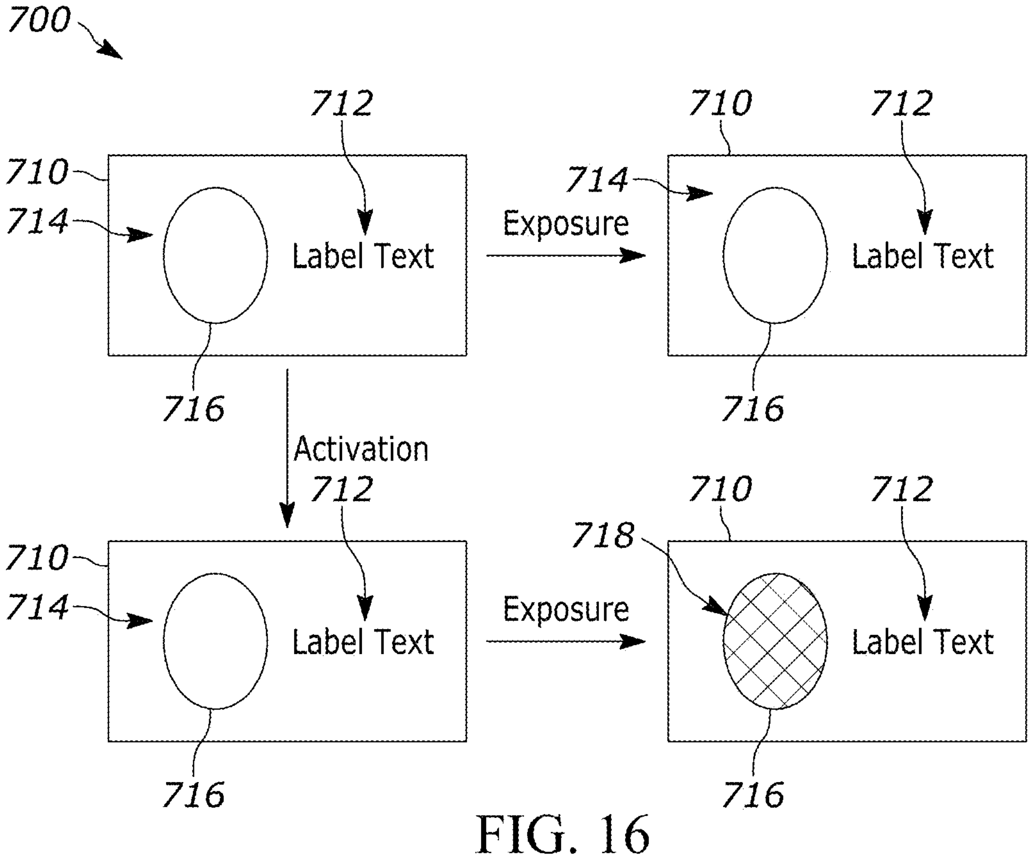
FIG. 16 illustrates a diagram of a media element exposed to the predetermined environmental condition before and after activation, according to at least one aspect of the present disclosure.

FIG. 16 illustrates a diagram 700 showing a media element 710 exposed to the predetermined environmental condition before and after activation, according to at least one aspect of the present disclosure. The media element 710 is substantially similar to media element 100. For the sake of brevity not all similarities will be discussed in detail. The media element 710 includes label text 712 and an environmental sensor 716. The environmental sensor 716 is substantially similar to environmental sensor 150 and for the sake of brevity not all similarities will be discussed in detail. The environmental sensor 716 begins in a non-activated configuration, where the environmental sensor 716 is in an initial sensor state 714 before activation and exposure. After an activation process, the environmental sensor 716 is placed in the activated configuration, where the environmental indicator material 158 in the environmental sensor 716 has been released from at least a portion of the microcapsules. When the released environmental indicator material 158 is exposed to the predetermined environmental condition, then the environmental sensor 716 transitions from the initial sensor state 714 to a second sensor state 718. In at least one aspect, before activation, the environmental sensor 716 does not change sensor states even when exposed to the predetermined environmental condition.

The environmental indicator material 158 encapsulated in the microcapsules can be different based on the desired environmental sensor 150 or 716. The environmental indicator material 158 can be a polymer, a polymer having side-chain crystallinity, an alkane wax, a polar protic material, a wax with a colorant, a gel with a colorant, an acid, a base, etc., or a combination therefor. Some example polar protic materials are polyethylene glycol, decanol, undecanol, dodecanol, and tridecanol. The type of environmental indicator material 158 used relates to the type of environmental sensor 150 or 716. Which allows the environmental indicator material 158 to be responsive to the appropriate predetermined environmental condition for the type of environmental sensor 150 or 716 desired. Some example predetermined environmental conditions are as follows: a temperature excursion above a predetermined temperature threshold for at least a predetermined amount of time, a temperature excursion below a predetermined temperature for at least a predetermined amount of time, a cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an ultraviolet light exposure, a humidity exposure, an exposure to a humidity level above a predetermined threshold, an exposure to a humidity level above a predetermined threshold for at least a predetermined amount of time, and etc.

Once the environmental indicator material 158 is released from at least a portion of the microcapsules (i.e. after an activation process ruptures the microcapsules) and exposed to the predetermined environmental condition, then the released environmental indicator material 158 changes from an initial material state (e.g. corresponding to the initial sensor state 714) to a second material state (e.g. corresponding to the second sensor state 718) producing an observable effect. The observable effect can be one of a color state change, a change in transparency, a change in hue, a change in an electrical property, a change in conductivity, a change in capacitance, movement of the environmental indicator material 158 along a substrate, etc., or combinations thereof. In at least one aspect, the observable effect can be a continuous transition; however, once a threshold is met, the environmental sensor 150 or 716 would be considered to go from the initial sensor state to the second sensor state.

The observable effect is different based on the environmental indicator material 158 and the design of the media element 100 or 710. For example, an observable effect of movement of the environmental indicator material 158 along a substrate of the media element 100 or 710 can be caused by the substrate including a wick that allows a liquid environmental indicator material 158 to move along the wick (e.g., the environmental indicator material 158 can be liquid or have increased fluidity in the second material state). As another example, a change in an electrical property can be caused by an environmental indicator material 158 that melts above a specific temperature, which then allows the material to change an electrical property of a device, for example altering a dielectric in a capacitor changing capacitance, or, with a conductive liquid, completing or breaking a circuit built into the substrate of the media element 100 or 710, which changes the electrical property.

Figure 17:
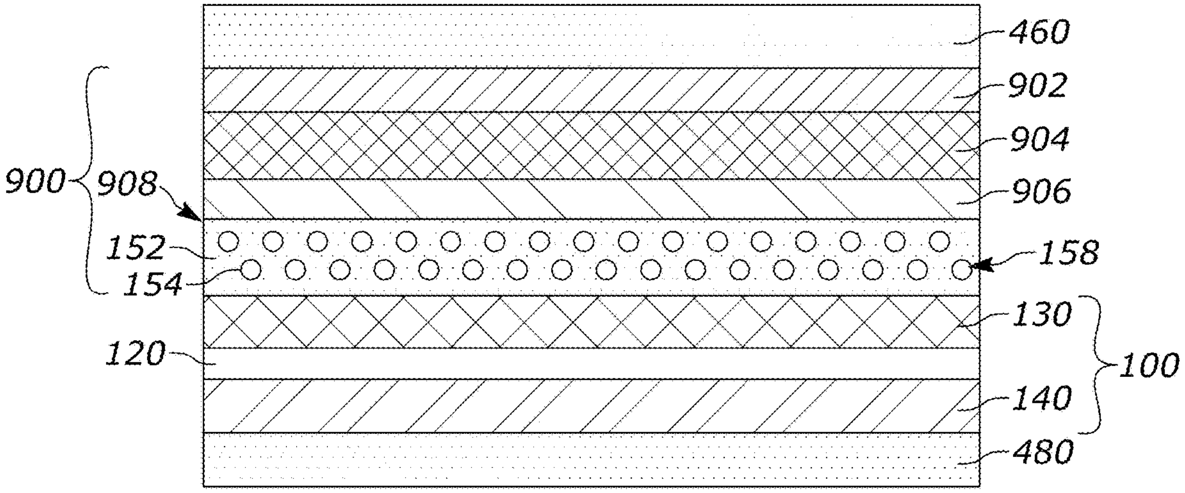
FIG. 17 illustrates a diagram of an example media element passing between the print head and platen roller during a thermal transfer printing process where an environmental sensor is printed onto the media element, according to at least one aspect of the present disclosure.

FIG. 17 illustrates a diagram of an example media element 100 passing between the print head 460 and platen roller 480 during a thermal transfer printing process where an environmental sensor 150 is printed onto the media element 100, according to at least one aspect of the present disclosure. As discussed in regard to FIG. 11, a thermal transfer printing process can be used to print an environmental sensor 150 on a media element 100 (e.g. as shown in FIG. 12). The environmental sensor 150 can be printed on any portion of the media element 100. As such, the environmental sensor 150 can be any size or shape desired by the user.

An indicator ribbon 900 is pressed against the media element 100 by the print head 460 and platen roller 480. The indicator ribbon 900 is substantially similar to the indicator ribbon 870 and for the sake of brevity not all similarities will be discussed in detail. The indicator ribbon 900 has an encapsulated indicator layer 908 attached to a release layer 906 that is attached to a ribbon substrate 904 (i.e. a carrier layer). The ribbon substrate 904 has a protective backing layer 902 attached opposite the release layer 906. In at least one aspect, the indicator ribbon 900 can be devoid of the protective backing layer 902. The encapsulated indicator layer 908 includes microcapsules 154 encapsulating an environmental indicator material 158. In at least one aspect, the microcapsules 154 are surrounded by a carrier material 152 (e.g. a wax material or a resin material).

The media element 100 includes a printable substrate made of layers attached to each other with adhesive layers 120. The printable substrate includes a face sheet layer 130 with an adhesive layer 120 attached to the back and a release liner 140 attached to adhesive layer 120. In an alternative aspect, the media element 100 is liner-less and does not include a release liner 140. In some aspects the media element 100 can include the face sheet layer 130 and be devoid of the adhesive layer 120 and/or the release liner 140.

The encapsulated indicator layer 908 is pressed against the top sheet 130 layer. As heat is applied to the indicator ribbon 900 by the thermal element print head 460, a portion of the encapsulated indicator layer 908 is transferred to the top sheet 130 layer of printable substrate forming an environmental sensor 150 on the media element 100. For example, the thermal transfer printing process can print the environmental sensor 150 on the media element 100 as shown in FIG. 12.

In at least one aspect, the force and/or temperature applied to the microcapsules 154 transferred to the media element 100, during the thermal transfer printing process, can cause at least a portion of the transferred microcapsules 154 to rupture. For example, the force and/or temperature applied to the microcapsules 154, during the thermal transfer printing process, is equal to or exceeds a predetermined force threshold and/or predetermined temperature threshold causing at least a portion of the microcapsules 154 to rupture. This process would allow the thermal transfer printing process to place an environmental sensor 150 in the activated configuration on the media element 100 at the time the environmental indicator material 158 is transferred to the media element 100.

In an alternative aspect, the microcapsules 154 can be configured to require a higher force and/or higher temperature to rupture than what the thermal transfer printing process applies to the microcapsules 154. For example, the force and/or temperature applied to the microcapsules 154, during the thermal transfer printing process, is below a predetermined force threshold and/or predetermined temperature threshold such that the microcapsules 154 do not rupture. In this aspect, the environmental sensor 150 can be printed onto the media element 100 and the media element 100 can be placed into the activated configuration at a later time. For example, the media element 100 with an environmental sensor 150 can be stored in the non-activated configuration. Then an activation mechanism can be used to place the media element 100 into the activated configuration at a time when the user desires.

Figure 18:
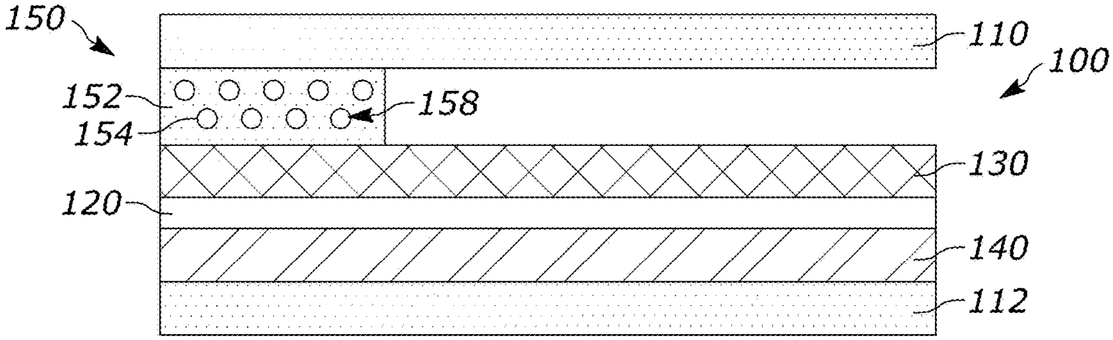
FIG. 18 illustrates a diagram of the example media element passing between two media processing components, according to at least one aspect of the present disclosure.

FIG. 18 illustrates a diagram of an example media element 100 passing between activation mechanism components 110, 112, according to at least one aspect of the present disclosure. In at least one aspect, the activation mechanism components 110, 112 cause at least a portion of the microcapsules 154 to rupture as the media element 100 is between activation mechanism components 110, 112. For example, the media element 100 can be fed back into a media processing device and the media processing components (e.g. print head 460 and platen roller 480) can be the activation mechanism components 110, 112 that supply the force and/or temperature needed to cause at least a portion of the microcapsules 154 to rupture. In this aspect, the activation mechanism components 110, 112 can supply a pressure of 13 pounds per square inch with the predetermined threshold being 8 pounds per square inch, which would cause a portion of the microcapsules 154 to rupture.

In an alternative aspect, the activation mechanism can be a user's hand and the user can apply a force to the media element 100 with the user's fingers making the fingers be the activation mechanism components 110, 112. In this aspect, the predetermined threshold can be 20 pounds per square inch and the user's hand can supply a pressure greater than 20 pounds per square inch causing at least a portion of the microcapsules 154 to rupture.

The releasing of the environmental indicator material 158 transitions the environmental sensor 150 on the media element 100 from a non-activated configuration to an activated configuration. Once in the activated configuration, the environmental sensor 150 can change from an initial sensor state to a second sensor state upon exposure of the environmental indicator material 158 to the predetermined environmental condition. In some aspects, the activation mechanism components 110, 112 can be part of the printing assembly of a media processing device, e.g. printing assembly 400 of media processing device 300. In some alternative aspects, the activation mechanism components 110, 112 can be part of an activation mechanism located downstream of the printing mechanism 400 in the media processing device 300. For example, the environmental sensor 150 can be printed onto the media element 100 using the printing mechanism 400 and a thermal transfer printing process. Then downstream of the printing mechanism 400, the media element 100 can enter an activation mechanism that places the media element 100 from the non-activated configuration to the activated configuration (see FIG. 30).

In at least one aspect, the activation mechanism components 110, 112 can be the print head 460 and the platen roller 480, respectively. For example, as a media element 100 has the environmental sensor 150 printed onto the media element 100 between the platen roller 480 and print head 460, the media processing device 300 applies a force and/or temperature on the media element 100 through the platen roller 480 and the print head 460. The force and/or temperature applied by the platen roller 480 and the print head 460 to the media element 100 is greater than or equal to the predetermined force threshold and/or predetermined temperature threshold such that a portion of the microcapsules in the environmental sensor 150 are ruptured. In at least one aspect, the force is a pressure. For example, the predetermined force threshold can be 5 pounds per square inch and the platen roller 480 and the print head 460 can supply a force of 8 pounds per square inch to the media element 100 causing a portion of the microcapsules to rupture.

In at least one aspect, the portion of the microcapsules 154 are ruptured based on both a force applied to the microcapsules 154 and a temperature of the microcapsules 154, where the force exceeds or equals a predetermined threshold and the temperature of the microcapsules 154 exceeds or is equal to a predetermined temperature threshold. In this aspect, the print head 460 is configured to apply the heat required to raise the temperature of the microcapsules above the predetermined temperature threshold and the print head 460 and platen roller 480 can apply a force to the microcapsules as a media element 100 passed between the print head 460 and platen roller 480.

Figure 19:
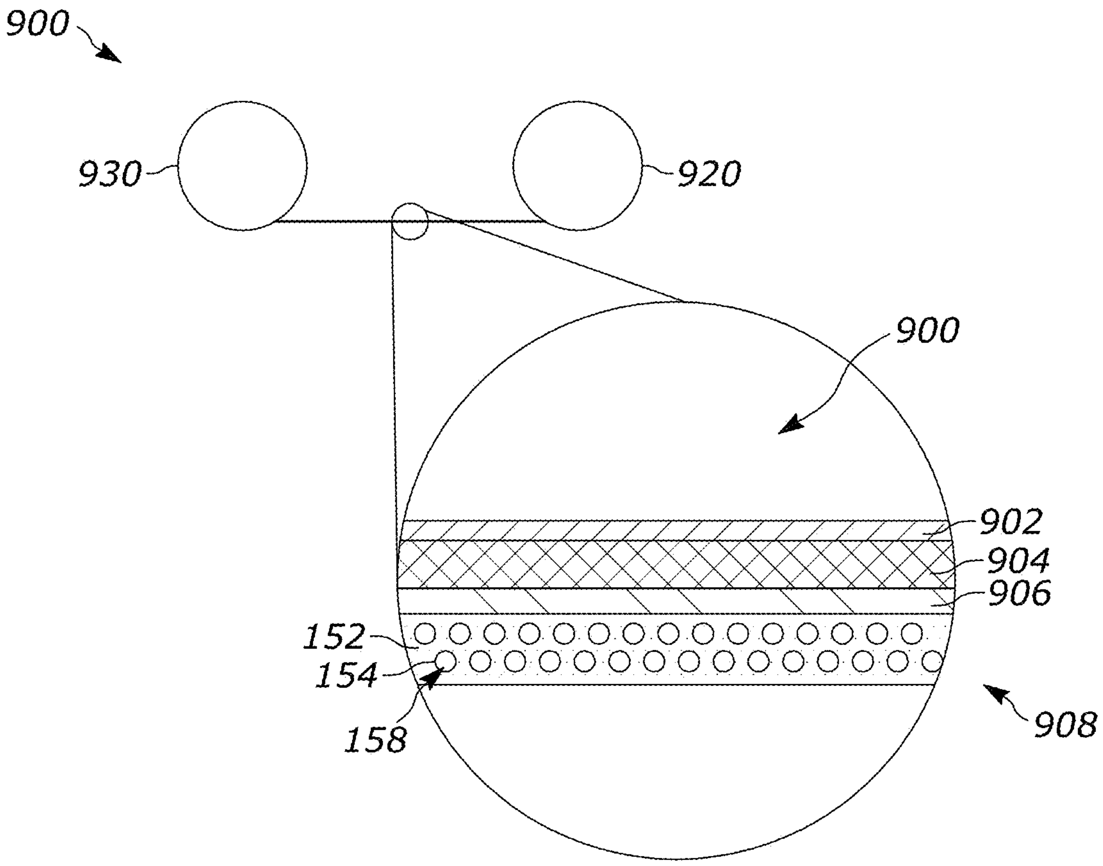
FIG. 19 illustrates a diagram of the layers in an encapsulated indicator material thermal transfer ribbon, according to at least one aspect of the present disclosure.

FIG. 19 illustrates a diagram of the layers in the indicator ribbon 900, according to at least one aspect of the present disclosure. As discussed in regard to FIG. 17, the indicator ribbon 900 has an encapsulated indicator layer 908 attached to a release layer 906 that is attached to a ribbon substrate 904 and the ribbon substrate 904 has the protective backing layer 902 attached opposite the release layer 906. In at least one aspect, the indicator ribbon 900 can be devoid of the protective backing layer 902. The encapsulated indicator layer 908 includes microcapsules 154 encapsulating an environmental indicator material 158. In at least one aspect, the microcapsules 154 are surrounded by a carrier material 152 (e.g. a wax material or a resin material). The indicator ribbon 900 includes a supply spool 920 and a take-up spool 930. The indicator ribbon 900 is initially wound around the supply spool 920 and extends to the take-up spool 930. During a thermal transfer printing process, a portion of the indicator ribbon 900 is unwound from the supply spool 920 and wound around the take-up spool 930 after passing between the print head 460 and platen roller 480.

Figure 20:
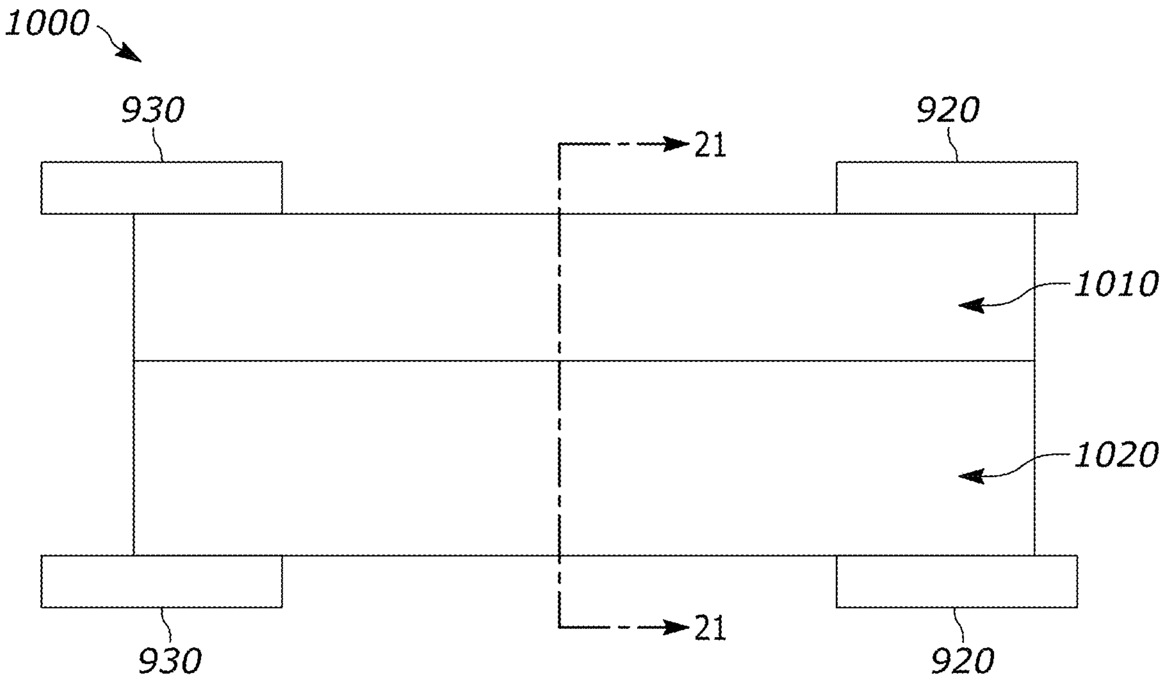
FIG. 20 illustrates a diagram of an example paneled thermal transfer ribbon with an encapsulated indicator material panel and an ink panel, according to at least one aspect of the present disclosure.
Figure 21:
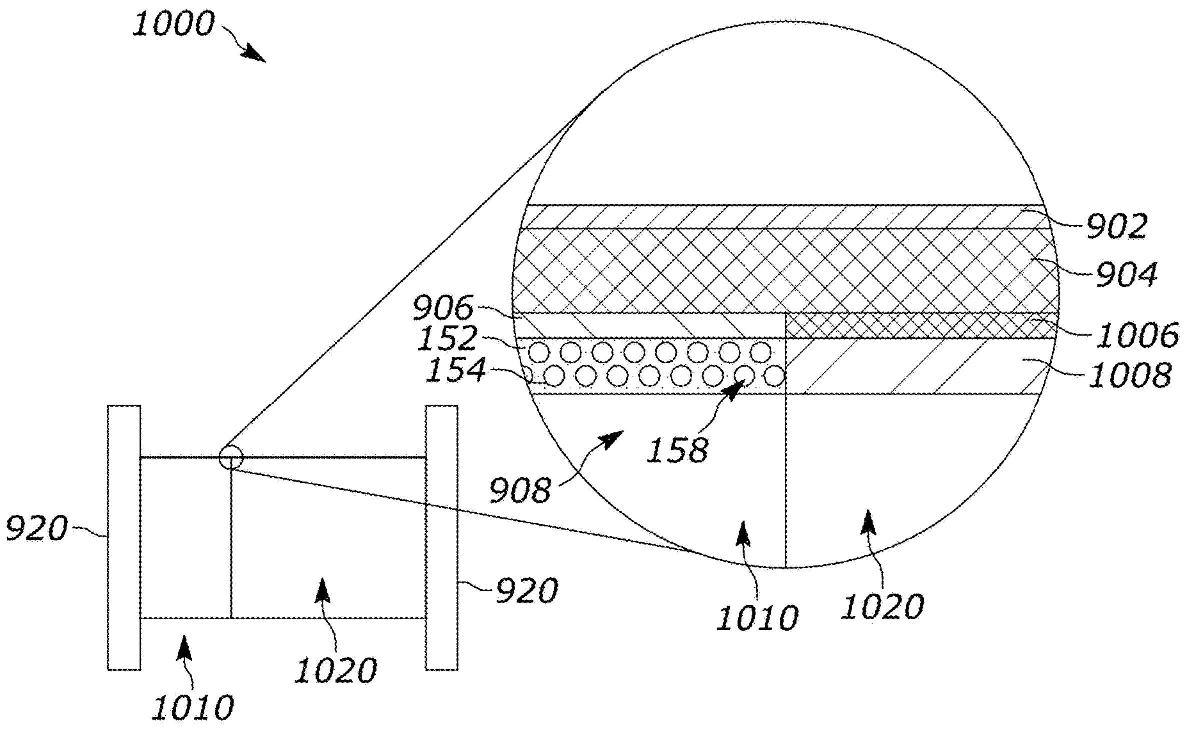
FIG. 21 illustrates a diagram of the layers in the paneled thermal transfer ribbon of FIG. 20, according to at least one aspect of the present disclosure.

The indicator ribbon 900 is shown as having only the encapsulated indicator layer 908 for a transfer layer. However an indicator ribbon can be paneled having different types of transfer layers (e.g. an encapsulated indicator panel and an ink panel). FIG. 20 illustrates a diagram of an example paneled thermal transfer ribbon 1000 with an encapsulated indicator material panel 1010 and an ink panel 1020, according to at least one aspect of the present disclosure. The paneled ribbon 1000 is substantially similar to indicator ribbon 900, and for the sake of brevity not all similarities will be discussed in detail. The paneled ribbon 1000 is broken into two panels 1010 and 1020 that extend the entire length of the paneled ribbon 1000. FIG. 21 illustrates a diagram of the cross-section taken along cross-section line in FIG. 20, according to at least one aspect of the present disclosure. FIG. 21 shows a detailed view of the layers in the paneled thermal transfer ribbon 1000.

The indicator material panel 1010 and the ink panel 1020 of paneled ribbon 1000 are both attached to the ribbon substrate 904. The ribbon substrate 904 has the protective backing layer 902 attached opposite the indicator material panel 1010 and the ink panel 1020. In at least one aspect, the indicator ribbon 900 cannot have the protective backing layer 902. The indicator material panel 1010 includes the encapsulated indicator layer 908 attached to the release layer 906 and the release layer 906 is attached to the ribbon substrate 904. The encapsulated indicator layer 908 includes microcapsules 154 encapsulating an environmental indicator material 158. In at least one aspect, the microcapsules 154 are surrounded by a carrier material 152 (e.g. a wax material or a resin material). The ink panel 1020 includes hot melt ink 108 attached to a release layer 1006 and the release layer 1006 is attached to the ribbon substrate 904. In at least one aspect, the release layer 906 and the release layer 1006 are the same and made of the same material. In an alternative aspect, the release layer 906 and the release layer 1006 are the different and made of the different materials.

The panels 1010 and 1020 extending the length of the paneled ribbon 1000 allow ink and microcapsules to be transferred to a media element, e.g. media element 100, simultaneously. For example, during a thermal transfer printing process, the paneled ribbon 1000 passes between the print head 460 and the platen roller 480. The area of the media element against the encapsulated indicator material panel 1010 may receive the microcapsules on a facing surface of the media element and the area of the media element against the ink panel 1020 may receive ink on a facing surface of the top sheet of the media element. In at least one aspect, the thickness of the ink panels 1020 and the indicator panels 1010 is the same.

Figure 22:
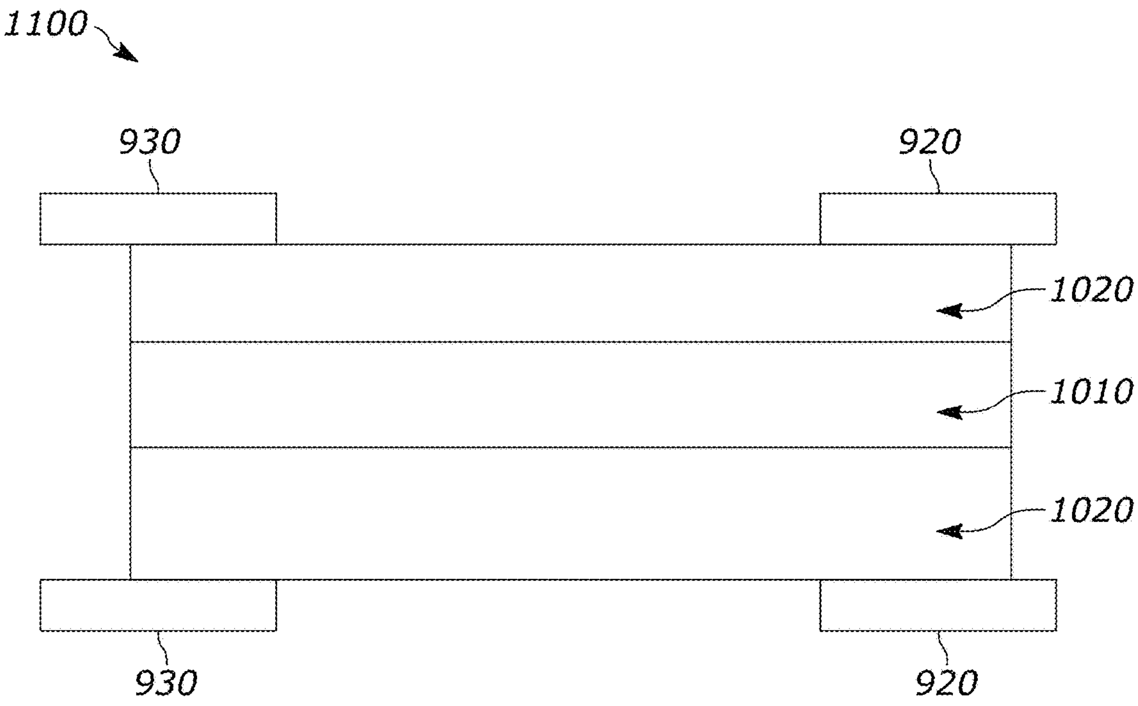
FIG. 22 illustrates a diagram of a paneled thermal transfer ribbon with an encapsulated indicator material panel and two ink panels, according to at least one aspect of the present disclosure.

FIG. 22 illustrates a diagram of an example paneled thermal transfer ribbon 1100 with an indicator panel and two ink panels, according to at least one aspect of the present disclosure. The paneled ribbon 1100 is substantially similar to paneled ribbon 1000 and indicator ribbon 900, and for the sake of brevity not all the similarities will be discussed in detail. The paneled ribbon 1100 has an ink panel 1020 on either side of the indicator panel 1010. As in paneled ribbon 1100 the indicator panel 1010 and the ink panels 1020 extend the entire length of the paneled ribbon 1100. In at least one aspect, the ink panels 1020 can have different colored ink or the same colored ink in the ink layers 1008. In at least one aspect, the thickness of the ink panels 1020 and the indicator panels 1010 is the same.

There can be any number of ink panels 1020 or indicator panels 1010 that extend the entire length of a paneled thermal transfer ribbon and only paneled ribbon 1000 and 1100 have been shown for the sake of brevity.

Figure 23:
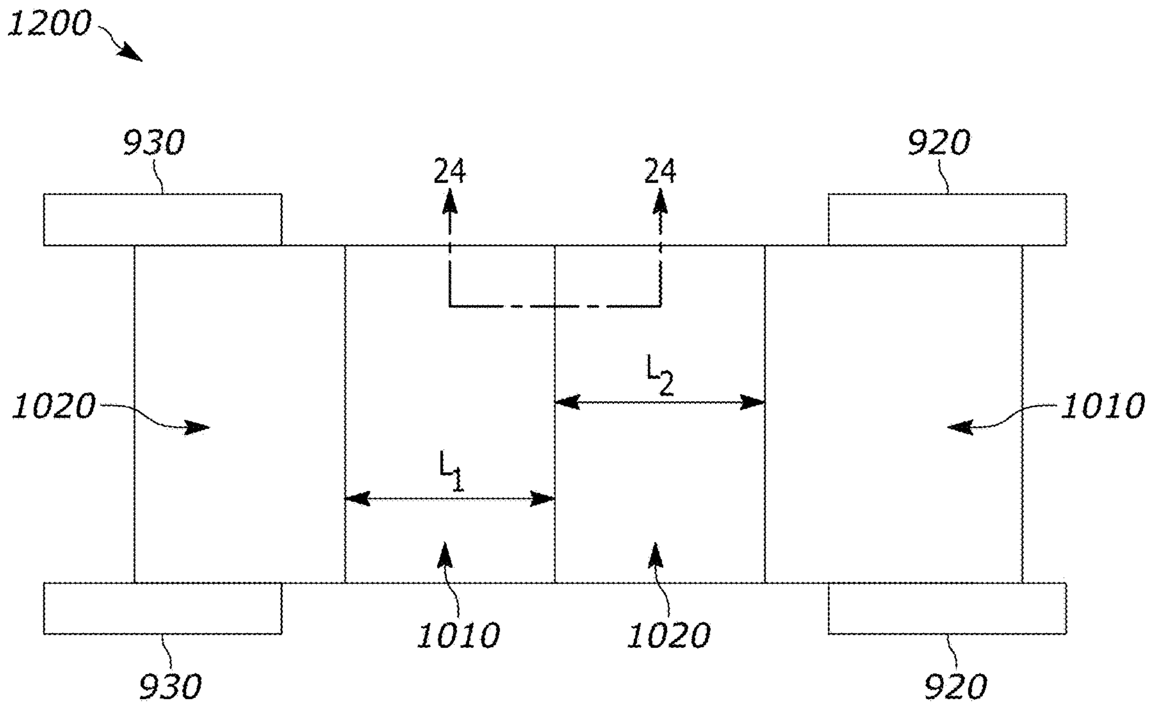
FIG. 23 illustrates a diagram of an example paneled thermal transfer ribbon with indicator panels and ink panels, according to at least one aspect of the present disclosure.

FIG. 23 illustrates a diagram of an example paneled thermal transfer ribbon 1200 with indicator panels 1010 and ink panels 1020, according to at least one aspect of the present disclosure. The paneled ribbon 1200 is substantially similar to paneled ribbon 1100, paneled ribbon 1000, and indicator ribbon 900, and for the sake of brevity not all the similarities will be discussed in detail. The indicator panels 1010 and the ink panels 1020 extend the entire width of the paneled ribbon 1200. The indicator panels 1010 extend a length $L_1$ along the paneled ribbon 1200 and the ink panels 1020 extend a length L2 along the paneled ribbon 1200. In at least one aspect, the length $L_1$ is the same as the length L2. In an alternative aspect, the length $L_1$ and the length L2 can be different distances. For example, length $L_1$ can be shorter than length L2 and have the environmental sensor 150 cover an area shorter than the length of the media element, e.g. media element 100, and the length L2 can be the length of the media element. In at least one aspect, the length $L_1$ and the length L2 can be the same as the length of a media element. In at least one aspect, the thickness of the ink panels 1020 and the indicator panels 1010 is the same. In an alternative aspect, the thickness of the ink panels 1020 and the indicator panels 1010 is different.

In at least one aspect, there can be any number of different panels that are sequentially in a row. The different panels would repeat to form the panel ribbon. When a thermal transfer printing is performed on a media element, each of the different panels has a thermal transfer printing process performed on the same media element. Then a new media element is printed. For example, a media element passes through the printing mechanism 400 against the indicator panel 1010 and a thermal transfer printing process is performed. Then the media element is retracted back through the printing mechanism 400 and a thermal transfer printing process is performed against the ink panel 1020. In at least one aspect, the paneled ribbon 1200 is adjusted to align a panel 1010 or 1020 with the media element.

Figure 24:
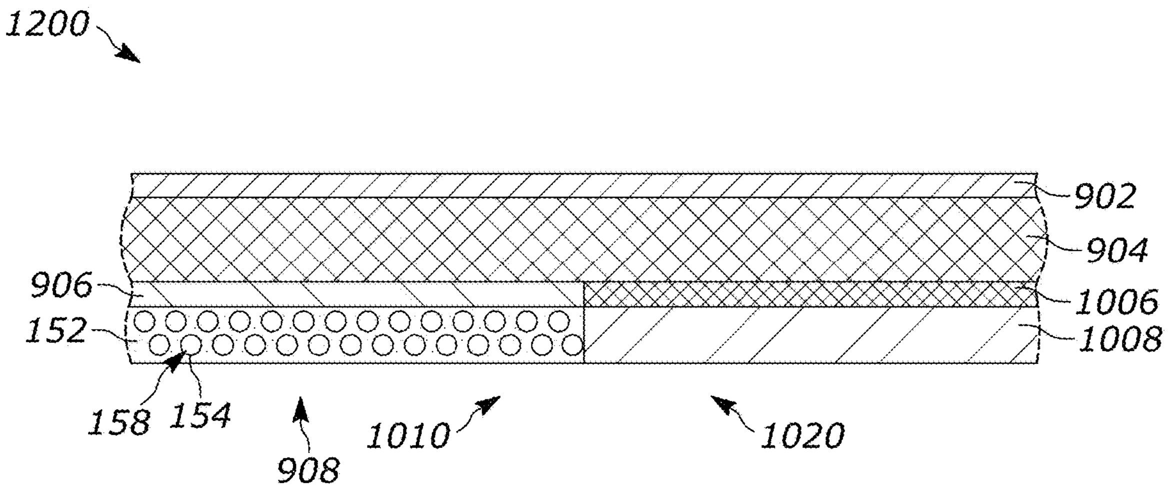
FIG. 24 illustrates a diagram of a cross-section taken along the cross-section line in FIG. 23, according to at least one aspect of the present disclosure.

FIG. 24 illustrates a diagram of a cross-section taken along the cross-section line in FIG. 23, according to at least one aspect of the present disclosure. FIG. 24 shows the layers in the panels 1010 and 1020 of paneled ribbon 1200. As shown in FIG. 24, the layers in the panels 1010 and 1020 are the same as in the detailed view of FIG. 21.

In at least one aspect, the environmental sensor 150 printed on a media element, (e.g. media element 100) is placed in the activated configuration during the thermal transfer printing process. As discussed previously, placing the environmental sensor 150 in the activated configuration requires a force and/or temperature greater than or equal to a predetermined force threshold and/or a predetermined temperature threshold to cause a portion of the microcapsules to rupture. Referring to FIG. 17, the force required to be applied by the print head 460 and platen roller 480 on the media element to rupture the microcapsules can be reduced if a bursting additive (e.g. an abrasive material) is added to the indicator ribbon (e.g. indicator ribbon 900, paneled ribbon 1000, paneled ribbon 1100, or paneled ribbon 1200). In at least one aspect, the bursting additive causes the microcapsules to rupture at a lower force from the print head 460 and platen roller 480. For example, the predetermined threshold force needed to be applied to the microcapsules 154 for a portion of the microcapsules 154 to rupture can be 15 pounds per square inch without an abrasive material and the predetermined threshold force can be 8 pounds per square inch with an abrasive material. As such, more microcapsules 154 can be ruptured at the same force with a bursting additive in the ribbon, than with no bursting additive in the ribbon. Thus, having a bursting additive in the ribbon can increase the amount of microcapsules 154 that are ruptured as the media element passes through the media processing device 300.

Some example abrasive materials for a bursting additive the can be added to an indicator ribbon are sandpaper of various grits from 60 grit to 300 grit, microneedles, metallic particles, glass particles, plastic particles, stone paper, a plastic/nylon mesh, steel wool, and natural and mineral abrasives such as sand, silicon dioxide, silica, silicate, silicon carbide, quartz, talc, alumina, borax, baking soda, quartz, garnet, emery, sandstone, powdered feldspar, salts, etc. If microneedles are used in the abrasive material then they can have a length of 150-1500 micrometers, 50-250 micrometers wide, and 1-25 micrometers in diameter. The microneedles are typically made of silicon, stainless steel, sugar, and/or polymers. The microneedles can be solid, coated, hollow, or dissolvable. In at least one aspect, the abrasive material is made of particles that have a diameter length in the range of 25 nanometers to 500 micrometers. In at least one aspect, the particles are harder than the microcapsules.

In at least one aspect, the predetermined threshold force is different based on which abrasive material is used or what the initial encapsulation is comprised of, as well as the environment of the encapsulation.

The bursting additive can be added to the thermal transfer ribbon in a variety of locations. FIG. 25-28 illustrate example diagrams of the layers in indicator thermal transfer ribbons 1210, 1220, 1230, and 1240 with a bursting additive layer 164, according to at least one aspect of the present disclosure. Indicator ribbons 1210, 1220, 1230, and 1240 are substantially similar to indicator ribbon 900, paneled ribbon 1000, paneled ribbon 1100, and paneled ribbon 1200, and for the sake of brevity not all the similarities will be discussed in detail.

Figure 25:
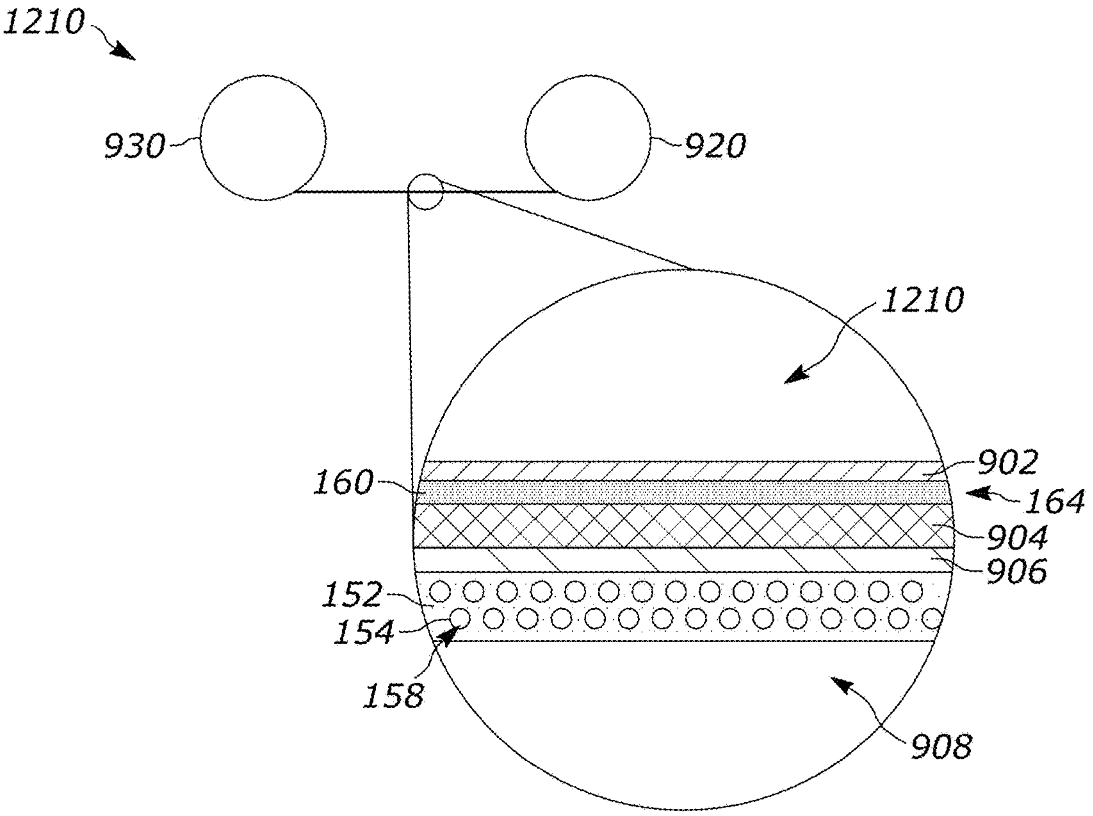
FIG. 25-28 illustrate example diagrams of the layers in indicator material thermal transfer ribbons with a bursting additive, according to at least one aspect of the present disclosure.

FIG. 25 illustrates indicator ribbon 1210. Similar to indicator ribbon 900, indicator ribbon 12010 has an encapsulated indicator layer 908 attached to a release layer 906 that is attached to the ribbon substrate 904. A bursting additive layer 164 is attached to the ribbon substrate 904 opposite the release layer 906. Then a protective backing layer 902 can be attached to the bursting additive layer 164. The bursting additive layer 164 includes a bursting additive 160 (e.g. an abrasive material as discussed above). In at least one aspect, the bursting additive layer 164 is attached to any layer attached to the ribbon substrate 904 on the opposite side that the encapsulated indicator layer 908 is attached.

Figure 26:
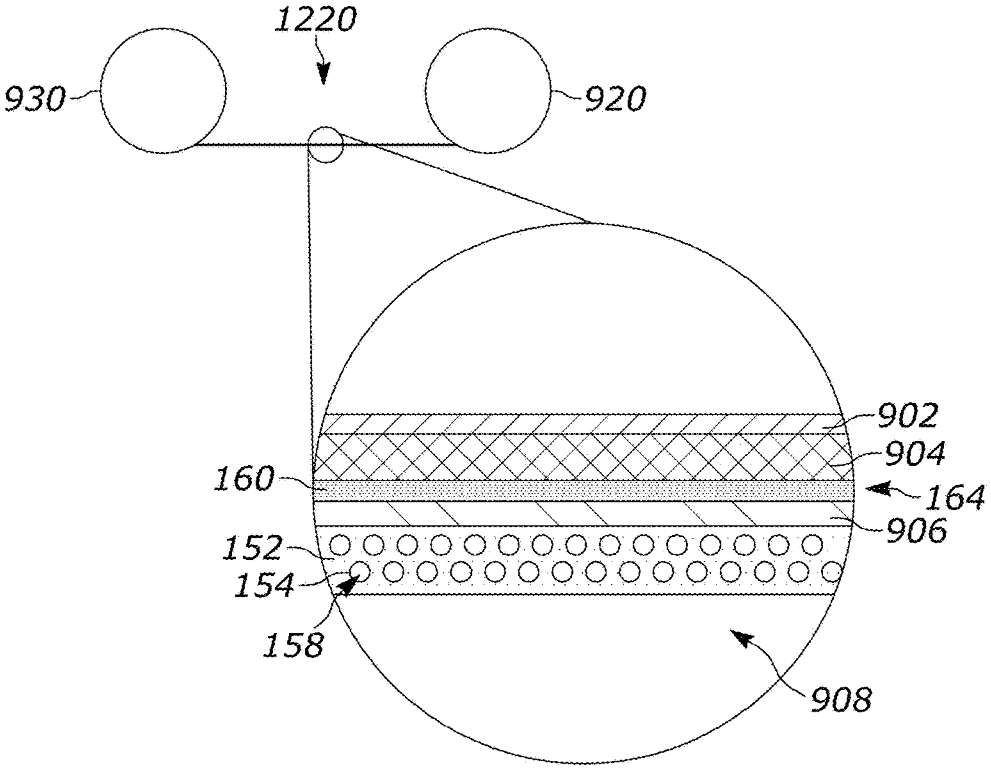

FIG. 26 illustrates indicator ribbon 1220. Similar to indicator ribbon 900 and indicator ribbon 1210, indicator ribbon 1220 has an encapsulated indicator layer 908 attached to a release layer 906. The release layer 906 is attached to a bursting additive layer 164 and the bursting additive layer 164 is attached to the ribbon substrate 904. A protective backing layer 902 can be attached opposite the bursting additive layer 164. The bursting additive layer 164 includes a bursting additive 160 (e.g. an abrasive material as discussed above). In at least one aspect, the bursting additive layer 164 is attached to any layer between the encapsulated indicator layer 908 and the ribbon substrate 904.

Figure 27:
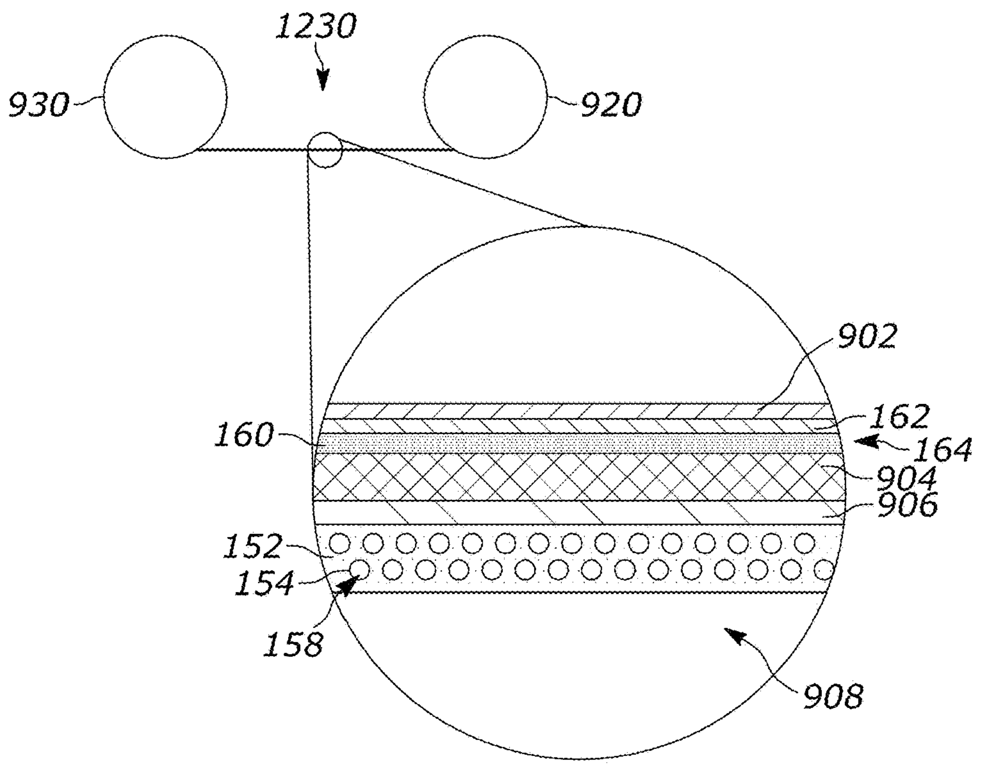

FIG. 27 illustrates indicator ribbon 1230. Similar to indicator ribbon 900, indicator ribbon 1210 and indicator ribbon 1220, indicator ribbon 1230 has an encapsulated indicator layer 908 attached to a release layer 906. The release layer 906 is attached to the ribbon substrate 904. A bursting additive layer 164 is attached to a substrate 162 and then the bursting additive 160 and the substrate 162 are attached to the ribbon substrate 904 opposite the release layer 906. A protective backing layer 902 can then be attached to the bursting additive 160 and the substrate 162. In an alternative aspect, the bursting additive 160 and the substrate 162 can be attached to the ribbon substrate 904 between the release layer 906 and ribbon substrate 904. Additionally, the bursting additive layer 164 and the substrate 162 can be attached to the ribbon substrate 904 such that the bursting additive layer 164 is in contact with the ribbon substrate 904 or such that the substrate 162 is in contact with the ribbon substrate 904. In at least one aspect, the bursting additive layer 164 and the substrate 162 are attached to any layer between the encapsulated indicator layer 908 and the ribbon substrate 904. In an alternative aspect, the bursting additive layer 164 and the substrate 162 are attached to any layer attached to the ribbon substrate 904 on the opposite side that the encapsulated indicator layer 908 is attached.

Figure 28:
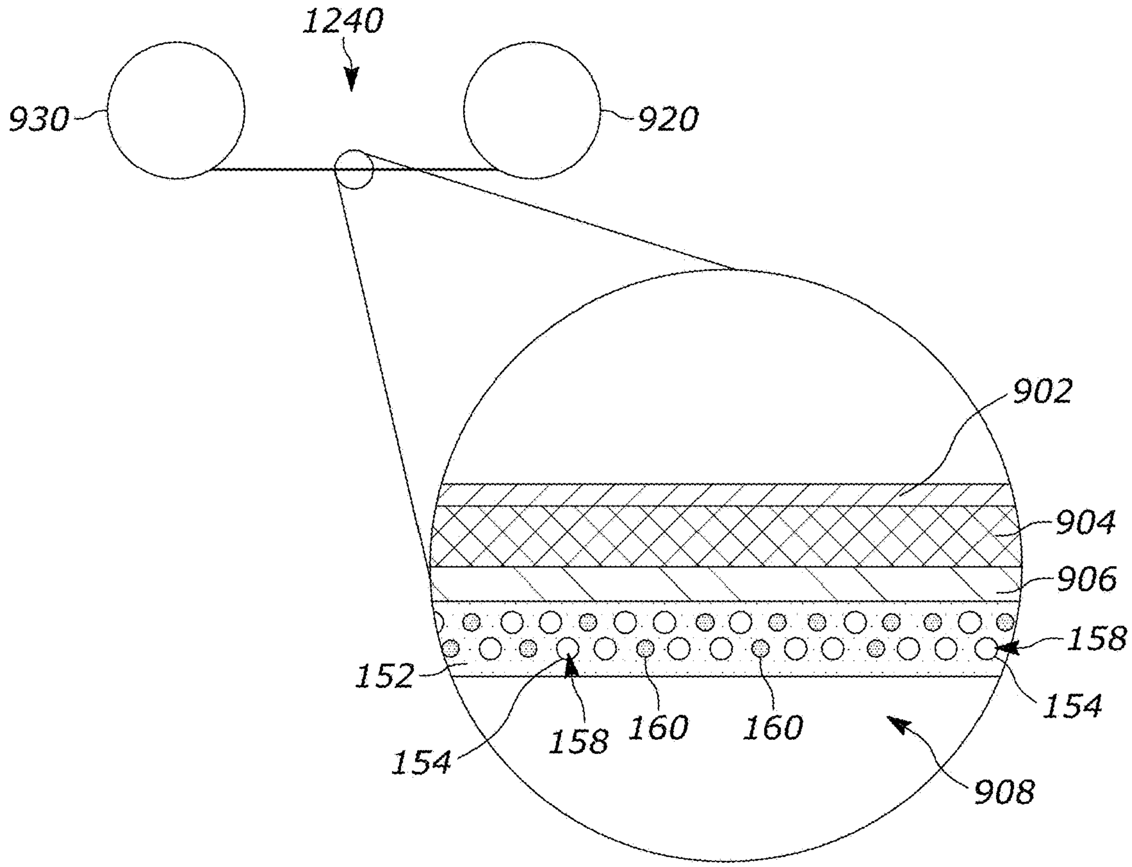

FIG. 28 illustrates indicator ribbon 1240. Similar to indicator ribbon 900, indicator ribbon 1210 indicator ribbon 1220, and indicator ribbon 1230, indicator ribbon 1240 has an encapsulated indicator layer 908 attached to a release layer 906. The release layer 906 is attached to the ribbon substrate 904. A protective backing layer 902 can be attached to the ribbon substrate opposite the release layer 906. The encapsulated indicator layer 908 includes microcapsules 154 encapsulating an environmental indicator material 158 and a bursting additive 160. For example, the transfer layer includes both the microcapsules 154 and a bursting additive 160. In at least one aspect, the microcapsules 154 and the bursting additive 160 are surrounded by a carrier material 152 (e.g. a wax material or a resin material).

In at least one aspect, the bursting additive 160 can be added to a release layer 906 of an indicator ribbon similar to indicator ribbon 1240. Indicator ribbon 1240 has the bursting additive 160 be added to the transfer layer along with the microcapsules 154; however, the bursting additive 160 can be added to the release layer 906. For example, referring to FIG. 19, the bursting additive 160 (e.g. bursting additive 160 in FIG. 28) can be added to the release layer 906 as particles throughout the release layer 906.

Indicator ribbon 1210 indicator ribbon 1220, indicator ribbon 1230, and indicator ribbon 1240 are some of the possible examples of indicator ribbons with a bursting additive layer 164. A bursting additive layer 164 can be positioned in a paneled ribbon (e.g. paneled ribbon 1000, 1100, or 1200) similar to indicator ribbon 1210 indicator ribbon 1220, indicator ribbon 1230, or indicator ribbon 1240. In at least one aspect, referring to paneled ribbon 1200 (FIG. 23), the indicator panels 1010 and the ink panels 1020 can include the bursting additive layer 164. In an alternative aspect, the indicator panels 1010 can include the bursting additive layer and the ink panels 1020 can include a fill layer that bridges the gap formed by the bursting additive layer 164 such that the thickness of the indicator panels 1010 and the ink panels 1020 is the same. In yet another alternative aspect, the indicator panels 1010 can include the bursting additive layer and thickness of the indicator panels 1010 and the ink panels 1020 can be different due to the bursting additive layer 164.

In all the ink ribbons with a bursting additive layer 164, the bursting additive material is proximate the microcapsules. For example, any location on the ribbon that has the encapsulated indicator layer 908 also has the bursting additive 160. This allows the bursting additive 160 to selectively interact with the microcapsule 154 to rupture the microcapsules 154 when a force is applied to the microcapsules 154 and bursting additive 160. In at least one aspect, the bursting additive 160 is made of an abrasive material that increases the strain on the individual microcapsules 154 due to a pressure force, shear force, cutting force, and/or friction force caused by the abrasive material (e.g. bursting additive 160) interacting with the individual microcapsules 154 in response to a force (e.g. pressure) being applied. In some aspects, the bursting additive 160 reduces the amount of force required to be applied to the media element to rupture a portion of the microcapsules. This process can reduce the predetermined threshold making it easier for the activation mechanism to rupture a portion of the microcapsules and place the environmental sensor 150 in the activated configuration.

In at least one aspect, the bursting additive (e.g. an abrasive material) can create an uneven surface that is pressed against the microcapsules causing a higher friction force, shear force, cutting force, and/or pressure force on the individual microcapsules increasing the strain on the individual microcapsules causing them to rupture at a lower force than without the abrasive material. In an additional or alternative aspect, the abrasive material increases the hardness of the media element at the location of the abrasive material. For example, the abrasive material can increase the hardness (or stiffness) of the indicator ribbon where the abrasive material is location. Increasing the hardness at the location of the microcapsules can increase the strain applied to each individual microcapsules from a force applied to the microcapsules 154. The increased strain from the hardness of the abrasive material can cause the microcapsules 154 to rupture at a lower applied force than on a media element without the abrasive material.

In at least one aspect, the bursting additive increases an effective force applied to the individual microcapsules of the microcapsules. For example, a pressure force can be applied to the microcapsules by the print head 460 and platen roller 480 and the bursting additive can increase and effective force applied to the individual microcapsules 154 of the microcapsules 154 by anywhere up to fifteen pounds per square inch depending on the material properties of the bursting additive 160. In this instance of a pressure force being applied, the pressure required to be applied to the media element in order to burst the microcapsules can be reduced by up to ninety percent depending on the material properties of the bursting additive.

A method to form an indicator ribbon includes applying a release layer to a ribbon substrate. The method further includes coating the release layer with a transfer layer and drying the transfer layer onto the release layer. In at least one aspect, the release layer is coated with the transfer layer using the drawdown coating method or other methods described previously. In this aspect, the drawdown coating method further includes applying the transfer layer to A section of the release layer and spreading the transfer layer along the release layer with a drawdown rod.

The transfer layer includes an environmental indicator material 158 encapsulated in microcapsules as discussed in regard to FIGS. 9-16. In at least one aspect, the microcapsules prevents the environmental indicator material 158 from producing an observable effect in response to exposure to a predetermined environmental condition. The environmental indicator material 158 is released from the microcapsules in response to the microcapsules being ruptured. After the environmental indicator material 158 is released and exposed to the predetermined environmental condition, the environmental indicator material 158 produces the observable effect. The observable effect results from a change in the environmental indicator material 158 from an initial state to a second state in response to the predetermined environmental condition.

The method further includes attaching a first end of the ribbon substrate to a supply spool and attaching a second end of the ribbon substrate to a take-up spool. The method further includes winding the ribbon substrate around the supply spool. In at least one aspect, the first end of the ribbon is positioned adjacent to a hollow core and a length of the ribbon is wound around the hollow core. The completed ribbon spool may then be installed in the printer by sliding the hollow core onto a ribbon supply spindle of the printer (e.g. ribbon supply spindle 420), the second end of the ribbon is unwound from the hollow core and threaded through a print apparatus of the printer, and the second end of the ribbon is attached to a ribbon take-up apparatus of the printer (e.g. ribbon take-up spindle 430), or to a second hollow core positionable on the ribbon take-up apparatus.

A bursting additive can also be added to the ribbon. In at least one aspect, the method further includes attaching an intermediate layer to the ribbon substrate opposite the release layer (see FIG. 25). The intermediate layer can include the bursting additive. The bursting additive can include an abrasive material as discussed previously. In an alternative aspect, the method further includes attaching an intermediate layer to the ribbon substrate and attaching the release layer to the intermediate layer (See FIG. 26). The intermediate layer can include the bursting additive. In yet another aspect, the transfer layer can further include a bursting additive (see FIG. 28). In yet another aspect, the method further includes coating a bursting additive onto the ribbon substrate prior to applying the release layer to the ribbon substrate. In this aspect, the release layer is positioned against the bursting additive or the release layer is positioned opposite the bursting additive.

Figure 29:
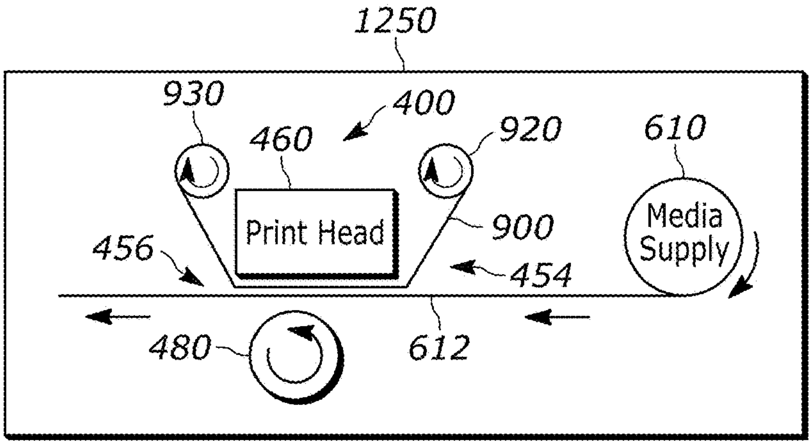
FIG. 29 shows a diagram which illustrates the operation of an example media processing device for printing an environmental sensor, according to at least one aspect of the present disclosure.

FIG. 29 shows a diagram which illustrates the operation of an example media processing device 1250 for printing an environmental sensor 150 on a media element, e.g. media element 100, according to at least one aspect of the present disclosure. Media processing device 1250 functions similar to media processing device 300 and for the sake of brevity not all similarities will be discussed in detail. The media processing device 1250 includes the media supply roll 610 that is made of the media web 612 that has media elements, e.g. media elements 100. Similar to media processing device 300, the media supply roll 610 can be replaced with a media input or a different media supply as discussed in regard to FIG. 3. The printing mechanism 400 has the indicator ribbon 900 (FIG. 19) installed. The media web 612 enters the printing assembly 400 at the upstream end 454 and passes by the print head 460 and platen roller 480 to exit out the downstream end 456 of the printing assembly 400. As a media element on the media web passes through the printing assembly 400, the printing assembly 400 performs a thermal transfer printing process on the media element to print an environmental sensor 150 on the media element.

In an alternative aspect, the printing mechanism 400 has the paneled ribbon 1000 (FIG. 20) or paneled ribbon 1100 (FIG. 22) installed. In this aspect, the printing mechanism 400 can simultaneously print ink and an environmental sensor 150 on the media element as the media element passes between the print head 460 and platen roller 480.

In yet another alternative aspect, the printing mechanism 400 has the paneled ribbon 1200 (FIG. 23) installed. In this aspect, the printing mechanism 400 can print ink onto the media element when an ink panel 1020 is pressed against the media element and an environmental sensor 150 when an indicator panel 1010 is pressed against the media element. The media element would pass through the printing mechanism 400 with either an ink panel 1020 or an indicator panel 1010 pressed against the media element and a thermal transfer printing process would occur. Then the media element would then be retracted back through the printing mechanism 400 and the paneled ribbon 1200 would be adjusted (if needed) to align the other panel type (an ink panel 1020 or an indicator panel 1010) with the media element. Then the media would be run forward through the printing mechanism 400 and a thermal transfer printing process would occur with the other panel type. In this way, a thermal transfer printing process was performed with the ink panel 1020 and a thermal transfer printing process was performed with the indicator panel 1010. The transfer printing process with the indicator panel 1010 would print the environmental sensor 150 onto the media element. It does not matter which thermal transfer printing process (ink or indicator panel) was performed first or second.

In at least one aspect, the environmental sensor 150 is placed in the activated configuration during the thermal transfer printing process. In this aspect, the print head 460 and platen roller 480 are used to supply a force and/or heat to the environmental sensor 150 being printed on the media element such that a portion of the microcapsules in the environmental sensor 150 are ruptured. In this aspect, the ribbon installed on the printing mechanism 400 can have a bursting additive to help rupture the microcapsules. The installed ribbon can be indicator ribbon 1210, indicator ribbon 1220, indicator ribbon 1230, indicator ribbon 1240, one of the paneled ribbons (e.g. paneled ribbon 1000, 1100, or 1200) with a bursting additive, or etc.

In an alternative aspect, the environmental sensor 150 is printed onto the media element and remains in the non-activated configuration during the thermal transfer printing process. In this aspect, an activation mechanism can be used later to place the media element in the activated configuration. For example, the printed media element can be run through a media processing device with pressure and temperature settings configured to apply enough heat and/or force to place the environmental sensor 150 in the activated configuration. Another example, is for the media processing device to have an activation mechanism positioned downstream of the printing mechanism, where the activation mechanism places the media element in the activated configuration. Yet another example, is to have a user use an activation mechanism (e.g. a handheld device or their hand itself) outside of the media processing device to activate the environmental sensor 150 when desired.

As discussed above, the environmental sensor 150 can exit the printing mechanism 400 in the non-activated or activated configuration. In at least one aspect, the configuration (activated or non-activated) of the environmental sensor 150 is based on the force and temperature settings of the printing mechanism 400. For example, the amount of force applied to the media element by the print head 460 and platen roller 480 and the temperature of the print head 460 can both be set by a user before a thermal transfer printing process is performed.

Figure 30:
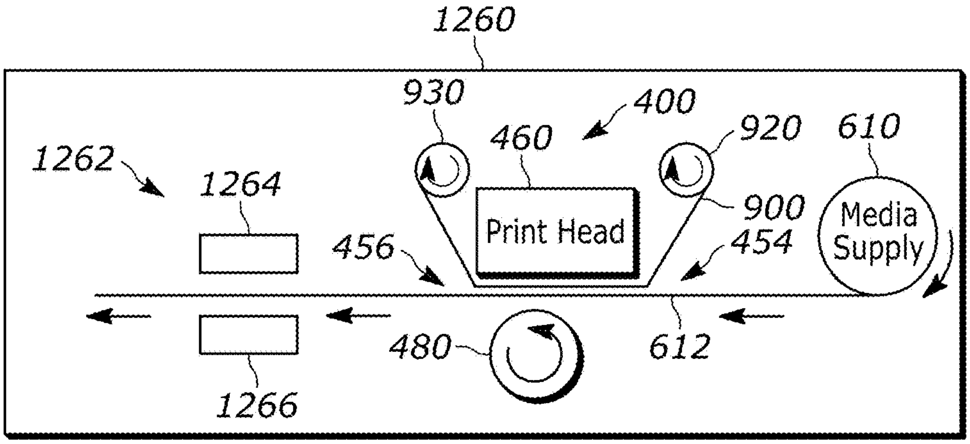
FIG. 30 shows a diagram which illustrates the operation of an example media processing device for printing an environmental sensor with an activation mechanism positioned downstream of the printing mechanism, according to at least one aspect of the present disclosure.

FIG. 30 shows a diagram which illustrates the operation of a media processing device 1260 that includes an activation mechanism 1262 positioned downstream of the printing assembly 400, according to at least one aspect of the present disclosure. Media processing device 1260 functions similar to media processing device 300 and media processing device 1250, and for the sake of brevity not all similarities will be discussed in detail. Just like media processing device 1250, the printing mechanism 400 has the indicator ribbon 900 (FIG. 19) installed. However, a paneled ribbon (e.g. paneled ribbon 1000, 1100, or 1200) can be installed instead. The media web 612 enters the printing assembly 400 at the upstream end 454 and passes by the print head 460 and platen roller 480 to exit out the downstream end 456 of the printing assembly 400. As a media element on the media web passes through the printing assembly 400, the printing assembly 400 performs a thermal transfer printing process on the media element to print an environmental sensor 150 on the media element. If the paneled ribbon (e.g. paneled ribbon 1000, 1100, or 1200) was installed, then an environmental sensor 150 and ink can be printed to the media element.

The media element exits the printing assembly 400 with the environmental sensor 150 in the non-activated configuration. For example, a predetermined temperature threshold can be 150° C. and a predetermined pressure force threshold can be 11 pounds per square inch. The thermal transfer printing process can be performed at 110° C. with a pressure force of 6 pounds per square inch, which is below the thresholds resulting in no to minimal rupturing of the microcapsules 154 in the environmental sensor 150. In at least one aspect, the microcapsules rupture based on a force and the temperature does not substantially affect the force required to rupture the microcapsules.

After the media element exits the printing assembly 400, the media element enters the activation mechanism 1262 and passes between the top portion 1264 and bottom portion 1266 of the activation mechanism 910. The activation mechanism supplies a heat and/or force to the media element such that at least a portion of the microcapsules of the environmental sensor 150 are ruptured. In at least one aspect, the activation mechanism increases the temperature of the microcapsules on the media element such that the temperature of the microcapsules exceeds or is equal to the predetermined temperature threshold. For example, the predetermined temperature threshold can be 150° C. and the activation mechanism can heat the media element up to 200° C. exceeding the temperature threshold. In an additional or alternative aspect, the activation mechanism applies a force to the microcapsules such that the force exceeds or equals a predetermined threshold. The force can be a pressure force, a shear force, a frictional force, and/or a cutting force that cause at least a portion of the microcapsules to rupture. For example, the predetermined pressure force threshold can be 11 pounds per square inch and the activation mechanism can supply a pressure force of 15 pounds per square inch exceeding the threshold. The rupturing of at least the portion of the microcapsules places the environmental sensor 150 on the media element in the activated configuration.

The activation mechanism 1262 can be devices that can supply a force and/or heat to a media element passing through the activation mechanism. In at least one aspect, the activation mechanism 1262 is a pair of rollers. For example, the top portion 1264 can be a first roller and the bottom portion 1266 can be a second roller. The first roller and the second roller apply a force to the media element as the media element is fed between the first roller and the second roller. Each roller can have an abrasive surface. The abrasive surface can include a rough surface, a textured surface, microneedles, or a hard surface, or combinations thereof. The media element is compressed between the abrasive surfaces of the rollers and the abrasive surfaces cause a friction force, a shear force, a cutting force, or a pressure force, or combinations thereof on the individual microcapsules on the media element. The force applied to the microcapsules is equal to or greater than the predetermined threshold causing at least a portion of the microcapsules to rupture. The rupturing of at least the portion of the microcapsules places the environmental sensor 150 on the media element in the activated configuration.

The activation mechanism 1262 being a pair of rollers is one example of an activation mechanism. Another example activation mechanism is a second print head assembly including a second print head and second platen roller where the temperature and pressure applied by the second print head and second platen roller are configured to supply enough heat and/or force to place the environmental sensor 150 in the activated configuration.

Figure 31:
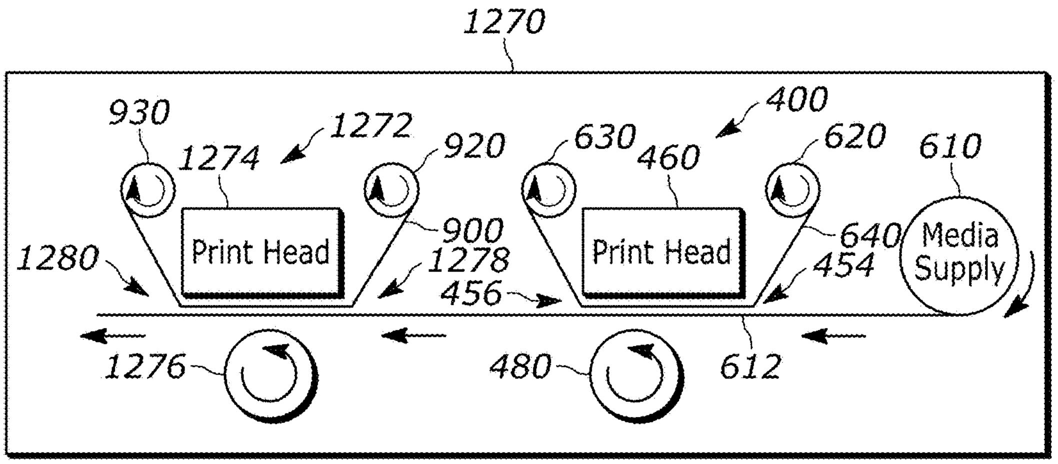
FIG. 31 shows a diagram which illustrates the operation of an example media processing device with dual print heads for printing an environmental sensor with one print head and ink with the other print head, according to at least one aspect of the present disclosure.

FIG. 31 shows a diagram which illustrates the operation of an example media processing device 1270 with dual print heads for printing an environmental sensor 150 with one print head 460 and ink with the other print head 1274, according to at least one aspect of the present disclosure. Media processing device 1270 functions similar to media processing device 300, media processing device 1250, and media processing device 1260 and for the sake of brevity not all similarities will be discussed in detail. Printing mechanism 1272, print head 1274, and platen roller 1276 are substantially similar to printing mechanism 400, print head 460, and platen roller 480. The print mechanism 400 has the ink ribbon 640 installed and the printing mechanism 1272 has the indicator ribbon 900 installed.

The media web 612 enters the printing assembly 400 at the upstream end 454 and passes by the print head 460 and platen roller 480 to exit out the downstream end 456 of the printing assembly 400. As a media element on the media web passes through the printing assembly 400, the printing assembly 400 performs a thermal transfer printing process on the media element to print ink on the media element.

After the media element exits the printing assembly 400, the media element on the media web 612 enters the printing assembly 1272 at the upstream end 1278 and passes by the print head 1273 and platen roller 1276 to exit out the downstream end 1280 of the printing assembly 1272. As the media element on the media web 612 passes through the printing assembly 1272, the printing assembly 1272 performs a thermal transfer printing process on the media element to print an environmental sensor 150 on the media element.

As discussed in regard to FIG. 29, the environmental sensor 150 can be placed in the activated configuration during the thermal transfer printing process or the environmental sensor 150 can remain in the non-activated configuration and rely on an activation mechanism to be used after the media element exits the printing assembly 1272. In at least one aspect, the media processing device 1270 can include an activation mechanism positioned downstream of the printing assembly 1272 like the media processing device 1260 (FIG. 30).

FIG. 31 shows the media processing device 1270 first printing with ink (e.g. ink ribbon 640) and then second printing with microcapsules (e.g. indicator ribbon 900); however, these processes can be switched. For example, the indicator ribbon 900 can be installed on printing mechanism 400 and the ink ribbon 640 can be installed in printing mechanism 1272. The processes would be performed the same and the media element would exit the media processing device with both ink and an environmental sensor 150 printed onto the media element. Additionally, or in the alternative, both ribbons can be an indicator ribbon 900, where the indicator ribbons 900 can include the same environmental indicator material 158 encapsulated in the microcapsules or can include different environmental indicator materials 158 encapsulated in the microcapsules. As an example, both ribbons can include environmental indicator material 158 that responds to temperature or one ribbon can include environmental indicator material 158 that response to temperature and the other ribbon can include environmental indicator material 158 that response to humidity. Where the ribbons both respond to the same environmental condition, the environmental indicator materials 158 can be formulated to respond to different response conditions or thresholds (e.g., for temperature sensitive environmental indicator materials 158, one can respond at a first temperature threshold and the other can response to a second temperature threshold). As discussed above, the environmental sensor 150 can exit the media processing device in either the activated configuration or non-activated configuration based on the settings (e.g. force and/or temperature) of the printing mechanism with the indicator ribbon 900 installed.

A method of applying an environmental sensor (e.g. environmental sensor 150) to a media element (e.g. media element 100) with a media processing device (e.g. media processing device 300, 1250, 1260, or 1270) includes feeding a media element into an upstream end of a print head assembly (e.g. printing assembly 400 or 1272) of the media processing device (e.g. media processing device 300, 1250, 1260, or 1270). The print head assembly includes a thermal transfer ribbon. The thermal transfer ribbon includes a carrier layer and a transfer layer operatively coupled to the carrier layer. The transfer layer includes an environmental indicator material 158 encapsulated in microcapsules, the microcapsules preventing the environmental indicator material 158 from producing an observable effect in response to exposure to a predetermined environmental condition. The environmental indicator material 158 is released from the microcapsules in response to the microcapsules being ruptured. After the environmental indicator material 158 is released and exposed to the predetermined environmental condition, the environmental indicator material 158 produces the observable effect, the observable effect resulting from a change in the environmental indicator material 158 from an initial material state to a second material state in response to the predetermined environmental condition.

The method further includes printing a portion of the transfer layer onto the media element by thermal transfer printing with the print head assembly. The portion of the transfer layer comprises a portion of the microcapsules that are deposited on the media element, where the microcapsules form an environmental sensor on the media element. The method further includes feeding the media element out of a downstream end of the print head assembly.

In at least one aspect, the portion of the microcapsules are configured to be ruptured in response to a force greater than or equal to a predetermined threshold. The force includes at least one of a pressure force, a shear force, a frictional force, or a cutting force applied to the media element. In an alternative aspect, the portion of the microcapsules are ruptured based on a combination of (a) a force greater than or equal to a predetermined threshold applied to the media element and (b) a temperature of the at least the portion of the microcapsules being equal to or greater than a predetermined temperature threshold.

In at least one aspect, the environmental sensor 150 is placed in the activated configuration during the thermal transfer printing. In this aspect, the method further includes rupturing at least a portion of the microcapsules that are transferred to the media element during the thermal transfer printing. In at least one aspect, the thermal transfer ribbon further comprises a bursting additive proximate the microcapsules. The bursting additive can reduce the amount of force required to rupture at least a portion of the microcapsules transferred to the media element during the thermal transfer printing.

In an alternative aspect, the environmental sensor 150 remains in the non-activated configuration during the thermal transfer printing. In this aspect, the method further includes feeding the media element into an upstream end of an activation mechanism of the media processing device and rupturing at least a portion of the microcapsules that were transferred to the media element by passing the media element through the activation mechanism, (e.g. activation mechanism 1262). In at least one aspect, the activation mechanism is a second print head assembly.

In at least one aspect, the print head assembly is a first print head assembly and the media processing device includes a second print head positioned downstream of downstream end of the first print head assembly. In this aspect, the method further includes feeding the media element into an upstream end of the second print head assembly. The second print head assembly includes an ink thermal transfer ribbon including an ink transfer layer. In this aspect, the method further includes printing a portion of the ink transfer layer onto the media element by thermal transfer printing with the second print head assembly and feeding the media element out of a downstream end of the second print head assembly (see FIG. 31).

In at least one aspect, the thermal transfer ribbon is paneled (e.g. paneled ribbon 1000, 1100, or 1200). In this aspect, the thermal transfer ribbon includes a microcapsule panel comprising the microcapsules and an ink panel positioned adjacent the microcapsule panel. In at least one aspect, the panels are arranged sequentially after one another (e.g. paneled ribbon 1200). In this aspect, the method further includes retracting the media element through the print head assembly from the downstream end toward the upstream end and printing a portion of the ink panel onto the media element by thermal transfer printing with the print head assembly.

In the foregoing detailed description, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term “logic” may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms “component,” “system,” “module” and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions can be implemented by a state machine that has no stored program instructions, or in one or more application specific integrated circuits (ASICs), in which each function or some combinations of certain of the functions are implemented as custom logic. Of course, a combination of the two approaches can be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A thermal transfer ribbon for use with a media processing device, the thermal transfer ribbon comprising:

a carrier layer; and a transfer layer operatively coupled to the carrier layer, the transfer layer comprising an environmental indicator material encapsulated in a plurality of microcapsules, the plurality of microcapsules preventing the environmental indicator material from producing an observable effect in response to exposure to a predetermined environmental condition, wherein the environmental indicator material is released from the plurality of microcapsules in response to the plurality of microcapsules being ruptured, and after the environmental indicator material is released and exposed to the predetermined environmental condition, the environmental indicator material produces the observable effect, the observable effect resulting from a change in the environmental indicator material from an original state to a second state in response to the predetermined environmental condition.

2. The thermal transfer ribbon of claim 1, wherein the transfer layer further comprises:

a microcapsule panel comprising the plurality of microcapsules; and an ink panel positioned adjacent the microcapsule panel.

3. The thermal transfer ribbon of claim 2, wherein the ink panel spans a length of the thermal transfer ribbon and the microcapsule panel spans the same length of the thermal transfer ribbon.

4. The thermal transfer ribbon of claim 2, wherein the microcapsule panel spans a first length of the thermal transfer ribbon, wherein the ink panel spans a second length of the thermal transfer ribbon, and wherein the second length begins sequentially after the first length.

5. The thermal transfer ribbon of claim 1, wherein the media processing device is a thermal transfer printer, wherein the plurality of microcapsules are configured to be printed on a media element by the media processing device when the media processing device is used to print the media element using a thermal transfer process, and wherein the plurality of microcapsules remain intact during the thermal transfer process.

6. The thermal transfer ribbon of claim 1, wherein the media processing device is a thermal transfer printer, and wherein the plurality of microcapsules are configured to rupture in response to a force applied by the media processing device to a media element when the media processing device is used to transfer at least a portion of the transfer layer to the media element using a thermal transfer process.

7. The thermal transfer ribbon of claim 6, wherein the thermal transfer ribbon further comprises a bursting additive proximate the plurality of microcapsules.

8. The thermal transfer ribbon of claim 7, wherein the transfer layer further comprises the bursting additive.

9. The thermal transfer ribbon of claim 7, wherein the carrier layer further comprises the bursting additive, and wherein the bursting additive is aligned with regions of the transfer layer containing the plurality of microcapsules.

10. The thermal transfer ribbon of claim 7, wherein the bursting additive is positioned in an intermediate layer attached to the carrier layer, and wherein the bursting additive is aligned with regions of the transfer layer containing the plurality of microcapsules.

11. The thermal transfer ribbon of claim 1, wherein the media processing device is a thermal transfer printer, wherein the plurality of microcapsules are configured to rupture in response to a heat applied by the media processing device to a media element when the device is used to transfer at least a portion of the transfer layer to the media element using a thermal transfer process, and wherein the heat causes a temperature of the at least the portion of the plurality of microcapsules to be equal to or greater than a predetermined temperature threshold.

12. A method of applying an environmental sensor to a media element with a media processing device, the method comprising:

feeding a media element into an upstream end of a print head assembly of the media processing device, wherein the print head assembly comprises a thermal transfer ribbon comprising:

a carrier layer; and a transfer layer operatively coupled to the carrier layer, the transfer layer comprising an environmental indicator material encapsulated in a plurality of microcapsules, the plurality of microcapsules preventing the environmental indicator material from producing an observable effect in response to exposure to a predetermined environmental condition, wherein the environmental indicator material is released from the plurality of microcapsules in response to the plurality of microcapsules being ruptured, and after the environmental indicator material is released and exposed to the predetermined environmental condition, the environmental indicator material produces the observable effect, the observable effect resulting from a change in the environmental indicator material from an original state to a second state in response to the predetermined environmental condition;

printing a portion of the transfer layer onto the media element by thermal transfer printing with the print head assembly, wherein the portion of the transfer layer comprises a portion of the plurality of microcapsules, wherein the portion of the plurality of microcapsules form a second plurality of microcapsules on the media element, and wherein the second plurality of microcapsules form the environmental sensor on the media element; and feeding the media element out of a downstream end of the print head assembly.

13. The method of claim 12, further comprising rupturing at least a portion of the second plurality of microcapsules during the thermal transfer printing.

14. The method of claim 12, further comprising:

feeding the media element into an upstream end of an activation mechanism of the media processing device; and rupturing at least a portion of the second plurality of microcapsules by passing the media element through the activation mechanism.

15. The method of claim 12, further comprising:

retracting the media element through the print head assembly from the downstream end toward the upstream end; and printing a portion of the ink panel onto the media element by thermal transfer printing with the print head assembly.

16. The method of claim 12, further comprising:

feeding the media element into an upstream end of a second print head assembly of the media processing device, wherein the second print head assembly comprises an ink thermal transfer ribbon comprising an ink transfer layer;

printing a portion of the ink transfer layer onto the media element by thermal transfer printing with the second print head assembly; and feeding the media element out of a downstream end of the second print head assembly.

17. A method of forming a thermal transfer ribbon, the method comprising:

applying a release layer to a substrate;

coating the release layer with a transfer layer, the transfer layer comprising an environmental indicator material encapsulated in a plurality of microcapsules, the plurality of microcapsules preventing the environmental indicator material from producing an observable effect in response to exposure to a predetermined environmental condition, wherein the environmental indicator material is released from the plurality of microcapsules in response to the plurality of microcapsules being ruptured, and after the environmental indicator material is released and exposed to the predetermined environmental condition, the environmental indicator material produces the observable effect, the observable effect resulting from a change in the environmental indicator material from an original state to a second state in response to the predetermined environmental condition; and attaching a first end of the substrate to a supply spool;

attaching a second end of the substrate to a take-up spool; and winding the substrate around the supply spool.

18. The method of claim 17, further comprising attaching an intermediate layer to the substrate opposite the release layer, wherein the intermediate layer comprises a bursting additive.

19. The method of claim 17, further comprising:

attaching an intermediate layer to the substrate, wherein the intermediate layer comprises a bursting additive; and attaching the release layer to the intermediate layer.

20. The method of claim 17, further comprising coating a bursting additive onto the substrate prior to applying the release layer to the substrate.

* * * * *